US012676479B2

(12) United States Patent
Wang et al.

(10) Patent No.: US 12,676,479 B2
(45) Date of Patent: Jul. 7, 2026

(54) METHOD FOR IMPLEMENTING FAST POWER RESPONSE AND NEW ENERGY POWER PLANT

(71) Applicant: HUAWEI DIGITAL POWER TECHNOLOGIES CO., LTD., Shenzhen (CN)

(72) Inventors: Shuchao Wang, Shanghai (CN); Yanbai Shen, Shanghai (CN); Yanzhong Zhang, Shanghai (CN)

(73) Assignee: Huawei Digital Power Technologies Co., Ltd., Shenzhen (CN)

( * ) Notice: Subject to any disclaimer, the term of this patent is extended or adjusted under 35 U.S.C. 154(b) by 439 days.

(21) Appl. No.: 18/240,449

(22) Filed: Aug. 31, 2023

(65) Prior Publication Data

US 2023/0411961 A1      Dec. 21, 2023

Related U.S. Application Data

(63) Continuation of application No. PCT/CN2021/078759, filed on Mar. 2, 2021.

(51) Int. Cl.
　　*H02J 3/00*　　　　(2026.01)
　　*H02J 3/14*　　　　(2026.01)
(52) U.S. Cl.
　　CPC ............... *H02J 3/003* (2020.01); *H02J 3/14* (2013.01)
(58) Field of Classification Search
　　CPC ...... H02J 3/003; H02J 3/14; H02J 3/48; H02J 3/50; H02J 13/00016; H02J 3/381; H02J 2300/24
See application file for complete search history.

(56) References Cited

U.S. PATENT DOCUMENTS

| 7,983,799 B2 * | 7/2011 | Bose | ......................... H02J 3/06 |
| | | | 700/297 |
| 9,893,533 B2 * | 2/2018 | Kitaji | ..................... H02J 13/14 |

(Continued)

FOREIGN PATENT DOCUMENTS

| CN | 109066773 A | 12/2018 |
| CN | 109256781 A | 1/2019 |
| CN | 110266052 A | 9/2019 |

OTHER PUBLICATIONS

Liu et al., "Technical requirements for connecting photovoltaic power station to power system," GB/T 19964-2012, Dec. 31, 2012, retrieved on Oct. 13, 2024, retrieved from URL <https://www.nssi.org.cn/nssi/front/81828553.html>, 7 pages (with English translation).

(Continued)

*Primary Examiner* — Menatoallah Youssef
*Assistant Examiner* — Michael J Warmflash
(74) *Attorney, Agent, or Firm* — Fish & Richardson P.C.

(57)　　　　　　ABSTRACT

This application discloses a method for implementing a fast power response and a power plant. The method is applied to a power plant-end power control apparatus, and includes determining a whole-plant reactive power target value and/or a whole-plant active power target value of the power plant. The method also includes determining, based on the whole-plant reactive power target value and/or the whole-plant active power target value, a second power control instruction readable to each photovoltaic inverter or power conversion system in the power plant. The method further includes delivering, through a subarray controller or a subarray communication device over an Ethernet network and/or a field bus network, the second power control instruction to each photovoltaic inverter or power conversion system indicated by address identifier information carried in the second power control instruction, so that each photovoltaic (Continued)

inverter or power conversion system makes a fast power response based on the second power control instruction.

20 Claims, 10 Drawing Sheets

(56) References Cited

U.S. PATENT DOCUMENTS

| | | | | |
|---|---|---|---|---|
| 10,381,841 | B2 * | 8/2019 | Oesselke | H02J 3/18 |
| 11,264,802 | B2 * | 3/2022 | Gupta | H02J 3/18 |
| 11,539,326 | B2 * | 12/2022 | Wang | H02S 40/36 |
| 2011/0060474 | A1 * | 3/2011 | Schmiegel | H02J 3/381 |
| | | | | 700/297 |
| 2012/0326511 | A1 * | 12/2012 | Johnson | H02J 3/381 |
| | | | | 307/52 |
| 2013/0018516 | A1 * | 1/2013 | Chee | H02J 13/12 |
| | | | | 700/287 |
| 2016/0087445 | A1 * | 3/2016 | Beekmann | H02J 3/381 |
| | | | | 307/52 |
| 2019/0273382 | A1 * | 9/2019 | Zhang | H02J 3/32 |
| 2020/0144820 | A1 * | 5/2020 | Aida | H02J 3/16 |
| 2024/0275176 | A1 * | 8/2024 | Rosado | H02J 3/381 |
| 2025/0192566 | A1 * | 6/2025 | Zhang | H02J 3/38 |

OTHER PUBLICATIONS

Liu et al., "Technical specification for reactive power compensation of PV power station," GB/T 29321-2012, Dec. 31, 2012, retrieved on Oct. 13, 2024, retrieved from URL <https://www.nssi.org.cn/nssi/front/81828553.html>,5 pages (with English translation).

International Search Report and Written Opinion in International Appln. No. PCT/CN2021/078759, mailed on Dec. 6, 2021, 15 pages (with English translation).

Extended European Search Report in European Appln. No. 21928471. 8, mailed on Jul. 16, 2024, 9 pages.

* cited by examiner

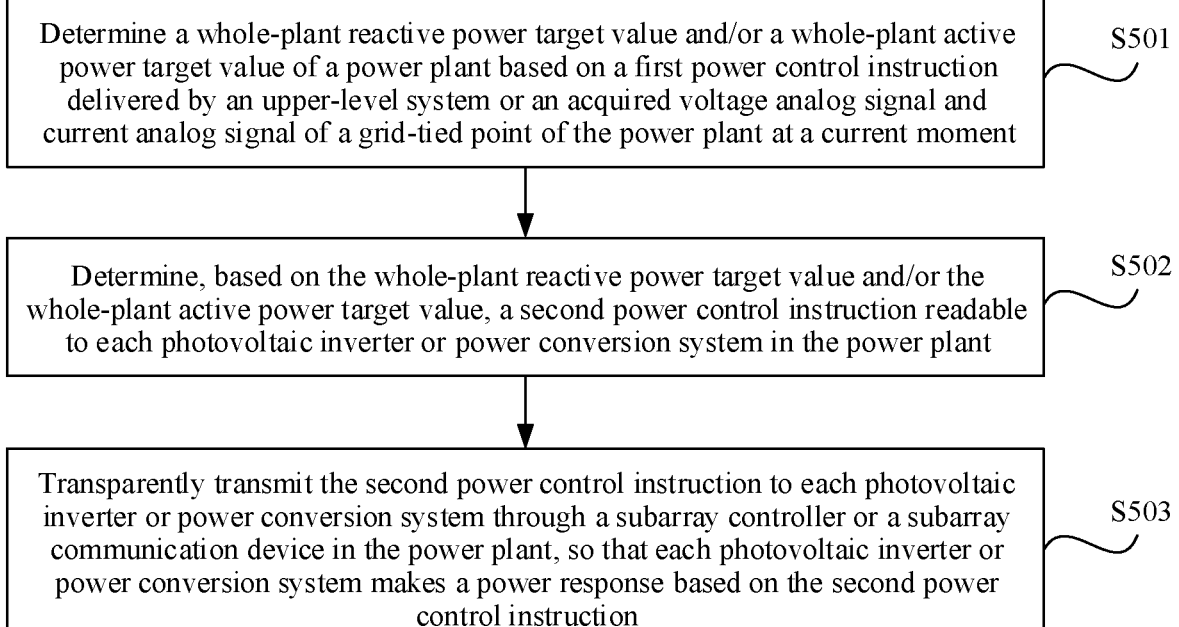

Determine a whole-plant reactive power target value and/or a whole-plant active power target value of a power plant based on a first power control instruction delivered by an upper-level system or an acquired voltage analog signal and current analog signal of a grid-tied point of the power plant at a current moment    S501

Determine, based on the whole-plant reactive power target value and/or the whole-plant active power target value, a second power control instruction readable to each photovoltaic inverter or power conversion system in the power plant    S502

Transparently transmit the second power control instruction to each photovoltaic inverter or power conversion system through a subarray controller or a subarray communication device in the power plant, so that each photovoltaic inverter or power conversion system makes a power response based on the second power control instruction    S503

FIG. 5

METHOD FOR IMPLEMENTING FAST POWER RESPONSE AND NEW ENERGY POWER PLANT

CROSS-REFERENCE TO RELATED APPLICATIONS

This application is a continuation of International Application No. PCT/CN2021/078759, filed on Mar. 2, 2021, the disclosure of which is hereby incorporated by reference in its entirety.

TECHNICAL FIELD

This application relates to the field of new energy power generation control, and in particular, to a method for implementing a fast power response and a new energy power plant.

BACKGROUND

A photovoltaic inverter in a photovoltaic power plant or a power conversion system in an energy storage power plant can output active power to keep a frequency of a power grid stable, and can output reactive power to keep a voltage of the power grid stable. For example, when voltage disturbance occurs in the power grid, the photovoltaic power plant or the energy storage power plant may perform fast reactive power coordinated control to participate in voltage regulation of the power grid, and plays a great role in safe and stable operation of the power grid.

Currently, a reactive power compensation device is usually used to perform fast reactive power coordinated control. Considering that a dynamic reactive power compensation response time of the reactive power compensation device is required to be not greater than 30 milliseconds in a national standard, only a static var generator (SVG) currently can well meet the related requirement. Therefore, in power grids in many areas of China, the SVG is listed as an essential device for new energy grid connection, and it is a mandatory requirement to configure the SVG for each power plant.

However, the SVG has problems such as high initial construction investment costs, high power consumption, and high operation and maintenance costs. Therefore, it is an important development direction of the industry to find a dynamic reactive power compensation resource that can meet the requirement of the 30-millisecond dynamic reactive power compensation response time in the national standard and that is good in economy and high in reliability.

SUMMARY

This application provides a method for implementing a fast power response and a new energy power plant, to resolve a problem, in the conventional technology, that a dynamic reactive power compensation resource that meets a requirement of a 30-millisecond dynamic reactive power compensation response time in a national standard is poor in economy and low in reliability.

According to a first aspect, an embodiment of this application provides a method for implementing a fast power response. The method is applied to a power plant-end power control apparatus in a new energy power plant. The power plant includes at least two subarrays, and the subarray includes a power control instruction processing and forwarding apparatus and at least three power control instruction execution apparatuses. The method includes:

determining a whole-plant reactive power target value and/or a whole-plant active power target value of the power plant based on a first power control instruction delivered by an upper-level system or an acquired voltage analog signal and current analog signal of a grid-tied point of the power plant at a current moment;

determining, based on the whole-plant reactive power target value and/or the whole-plant active power target value, a second power control instruction readable to each power control instruction execution apparatus in each subarray in the power plant, where the second power control instruction indicates a power target value of each power control instruction execution apparatus existing when the whole-plant reactive power target value and/or the whole-plant active power target value are/is reached; and transparently transmitting the second power control instruction to each power control instruction execution apparatus through a power control instruction processing and forwarding apparatus in each subarray in the power plant, so that each power control instruction execution apparatus makes a power response based on the second power control instruction.

Based on the technical solution, fast communication is implemented between the power plant-end power control apparatus and a target power control instruction execution apparatus. Compared with a case in which when TCP communication is performed between the power plant-end power control apparatus and the target power control instruction execution apparatus, because it needs to take at least 10 milliseconds to perform encoding and decoding between the two communication points and perform an entire transmission process, two handshakes need to be performed between the power plant-end power control apparatus and the power control instruction processing and forwarding apparatus and between the power control instruction processing and forwarding apparatus and the target power control instruction execution apparatus, that is, 20 milliseconds needs to be consumed, in this embodiment of this application, the power plant-end power control apparatus directly communicates with the target power control instruction execution apparatus, that is, the power control instruction processing and forwarding apparatus implements only network transparent transmission, and does not perform a handshake, and only 10 milliseconds needs to be consumed, to reserve technical feasibility for implementing a 30-millisecond reactive power response based on the power control instruction execution apparatus.

In a possible design, the determining a whole-plant reactive power target value of the power plant based on a first power control instruction delivered by an upper-level system or an acquired voltage analog signal of a grid-tied point of the power plant at a current moment includes:

if the first power control instruction delivered by the upper-level system includes the whole-plant reactive power target value, determining the whole-plant reactive power target value of the power plant based on the first power control instruction; or acquiring the voltage analog signal of the grid-tied point of the power plant at the current moment, and processing the voltage analog signal of the grid-tied point at the current moment based on an instantaneous voltage amplitude calculation algorithm, to determine an instantaneous voltage amplitude of the grid-tied point at the current moment; and determining the whole-plant reactive power target value of the power plant based on the instantaneous voltage amplitude of the grid-tied point at the current moment.

Based on the technical solution, the instantaneous voltage amplitude of the grid-tied point of the power plant at the current moment is quickly acquired and calculated. Two or three sampling points are used as an example. It takes only 2-3 milliseconds for the power plant-end power control apparatus to acquire the voltage analog signal of the grid-tied point of the power plant at the current moment and process the voltage analog signal of the grid-tied point of the power plant at the current moment based on the instantaneous voltage amplitude calculation algorithm, to determine the instantaneous voltage amplitude of the grid-tied point of the power plant at the current moment. Compared with a case in which when the instantaneous voltage amplitude of the grid-tied point of the power plant at the current moment is conventionally determined based on a third-party electricity meter, it needs to take at least 20 milliseconds for the electricity meter to calculate the voltage amplitude, and it needs to take 500 milliseconds or even a longer time to transmit a result to the power plant-end power control apparatus through a serial port, or the power plant-end power control apparatus 100 acquires only the voltage analog signal of the grid-tied point of the power plant at the current moment, but it usually needs to take a cycle time, namely, 20 milliseconds, to process the voltage analog signal of the grid-tied point of the power plant at the current moment based on a conventional Fourier calculation algorithm, to determine the instantaneous voltage amplitude of the grid-tied point of the power plant at the current moment, in this embodiment of this application, only 2-3 milliseconds is consumed, and space of approximately 27 milliseconds is reserved for a subsequent step, to reserve technical feasibility for implementing a 30-millisecond reactive power response based on the power control instruction execution apparatus.

In a possible design, the determining a whole-plant active power target value of the power plant based on a first power control instruction delivered by an upper-level system or an acquired voltage analog signal and current analog signal of a grid-tied point of the power plant at a current moment includes:

if the first power control instruction delivered by the upper-level system includes the whole-plant active power target value, determining the whole-plant active power target value of the power plant based on the first power control instruction; or acquiring the voltage analog signal and the current analog signal of the grid-tied point of the power plant at the current moment, processing the voltage analog signal and the current analog signal of the grid-tied point at the current moment based on an instantaneous amplitude calculation algorithm, to determine instantaneous active power and an instantaneous voltage amplitude of the grid-tied point at the current moment, and determining a frequency value based on the instantaneous voltage amplitude; and determining the whole-plant active power target value of the power plant based on the instantaneous active power at the current moment and the frequency value.

In a possible design, the power target value of each power control instruction execution apparatus is a power target absolute value, a power target percentage value, a variation absolute value, or a variation percentage value, the power target percentage value is a percentage value between the power target absolute value and rated power of the power control instruction execution apparatus, the variation absolute value is an absolute difference between the power target absolute value and power of the power control instruction execution apparatus at the current moment, and the variation percentage value is a percentage value between the variation absolute value and the rated power of the power control instruction execution apparatus.

In a possible design, the second power control instruction carries address identifier information of each power control instruction execution apparatus, and the address identifier information includes any one or a combination of an internet protocol IP address, a unicast media access control MAC address, a multicast or broadcast MAC address, and/or a character string corresponding to a target power control instruction execution apparatus.

In a possible design, the transparently transmitting the second power control instruction to each power control instruction execution apparatus through a power control instruction processing and forwarding apparatus in each subarray in the power plant includes:

delivering the second power control instruction to the power control instruction processing and forwarding apparatus in each subarray in the power plant, so that the power control instruction processing and forwarding apparatus directly delivers, through a communication network chip, the second power control instruction to a target power control instruction execution apparatus in the subarray corresponding to the power control instruction processing and forwarding apparatus, where the target power control instruction execution apparatus is a power control instruction execution apparatus indicated by the address identifier information carried in the second power control instruction.

In a possible design, the power control instruction processing and forwarding apparatus includes a subarray controller or a subarray communication device;

the subarray controller is a device that is installed in the subarray and that matches a step-up transformer in the subarray, and the subarray controller is any one or more of a subarray data acquisition apparatus, an all-in-one smart box-type transformer measurement and control apparatus, a communication management apparatus, or a protocol conversion apparatus;

the subarray communication device is any one or more of a network switch, a gateway machine, an optical fiber repeater, a bus repeater, or a bus extension apparatus; and the power control instruction execution apparatus includes a photovoltaic inverter or a power conversion system.

In a possible design, Ethernet network communication and/or field bus network communication are/is performed between the power plant-end power control apparatus and each power control instruction execution apparatus;

the Ethernet network communication is any one of generic object oriented substation event GOOSE communication or user datagram protocol UDP communication; and the field bus network communication is any one of controller area network CAN communication, Ethernet for control automation technology EtherCAT communication, or open source real-time communication technology Ethernet Powerlink communication.

Based on the technical solution, fast communication is implemented between the power plant-end power control apparatus and the target power control instruction execution apparatus. In this embodiment of this application, the power plant-end power control apparatus directly communicates with the target power control instruction execution apparatus, that is, the power control instruction processing and forwarding apparatus implements only network transparent transmission, and does not perform a handshake. In addition, GOOSE communication, UDP communication, or field bus network communication is performed between the power plant-end power control apparatus and the target power control instruction execution apparatus, to reduce a network packet assembly and disassembly time as much as possible, improve timeliness, and implement fast communication between the power plant-end power control apparatus and the target power control instruction execution apparatus within 5 milliseconds, so as to reserve technical feasibility for implementing a 30-millisecond reactive power response based on the power control instruction execution apparatus.

In a possible design, before the determining a whole-plant reactive power target value and/or a whole-plant active power target value of the power plant, the method further includes:

acquiring the voltage analog signal of the grid-tied point of the power plant at the current moment, processing the voltage analog signal of the grid-tied point at the current moment based on the instantaneous voltage amplitude calculation algorithm, to determine the instantaneous voltage amplitude of the grid-tied point at the current moment, and determining the frequency value based on the instantaneous voltage amplitude;

determining whole-plant reactive power and/or whole-plant active power of the power plant at the current moment based on the instantaneous voltage amplitude of the grid-tied point at the current moment and the frequency value; and determining whether the whole-plant reactive power and/or the whole-plant active power of the power plant at the current moment fall/falls outside a preset interval.

According to a second aspect, this application further provides a new energy power plant, including a power plant-end power control apparatus and at least two subarrays. The subarray includes a power control instruction processing and forwarding apparatus and at least three power control instruction execution apparatuses.

The power plant-end power control apparatus is configured to determine a whole-plant reactive power target value and/or a whole-plant active power target value of the power plant based on a first power control instruction delivered by an upper-level system or an acquired voltage analog signal and current analog signal of a grid-tied point of the power plant at a current moment.

The power plant-end power control apparatus is further configured to: determine, based on the whole-plant reactive power target value and/or the whole-plant active power target value, a second power control instruction readable to each power control instruction execution apparatus in each subarray in the power plant, and deliver the second power control instruction to a power control instruction processing and forwarding apparatus in each subarray in the power plant. The second power control instruction indicates a power target value of each power control instruction execution apparatus existing when the whole-plant reactive power target value and/or the whole-plant active power target value are/is reached.

The power control instruction processing and forwarding apparatus in each subarray in the power plant is configured to transparently transmit the second power control instruction to each power control instruction execution apparatus.

Each power control instruction execution apparatus is configured to make a power response based on the second power control instruction.

In a possible design, when determining the whole-plant reactive power target value of the power plant based on the first power control instruction delivered by the upper-level system or the acquired voltage analog signal of the grid-tied point of the power plant at the current moment, the power plant-end power control apparatus is specifically configured to:

if the first power control instruction delivered by the upper-level system includes the whole-plant reactive power target value, determine the whole-plant reactive power target value of the power plant based on the first power control instruction; or acquire the voltage analog signal of the grid-tied point of the power plant at the current moment, and process the voltage analog signal of the grid-tied point at the current moment based on an instantaneous voltage amplitude calculation algorithm, to determine an instantaneous voltage amplitude of the grid-tied point at the current moment; and determine the whole-plant reactive power target value of the power plant based on the instantaneous voltage amplitude of the grid-tied point at the current moment.

In a possible design, when determining the whole-plant active power target value of the power plant based on the first power control instruction delivered by the upper-level system or the acquired voltage analog signal and current analog signal of the grid-tied point of the power plant at the current moment, the power plant-end power control apparatus is specifically configured to:

if the first power control instruction delivered by the upper-level system includes the whole-plant active power target value, determine the whole-plant active power target value of the power plant based on the first power control instruction; or acquire the voltage analog signal and the current analog signal of the grid-tied point of the power plant at the current moment, process the voltage analog signal and the current analog signal of the grid-tied point at the current moment based on an instantaneous amplitude calculation algorithm, to determine instantaneous active power and an instantaneous voltage amplitude of the grid-tied point at the current moment, and determine a frequency value based on the instantaneous voltage amplitude; and determine the whole-plant active power target value of the power plant based on the instantaneous active power at the current moment and the frequency value.

In a possible design, the power target value of each power control instruction execution apparatus is a power target absolute value, a power target percentage value, a variation absolute value, or a variation percentage value, the power target percentage value is a percentage value between the power target absolute value and rated power of the power control instruction execution apparatus, the variation absolute value is an absolute difference between the power target absolute value and power of the power control instruction execution apparatus at the current moment, and the variation percentage value is a percentage value between the variation absolute value and the rated power of the power control instruction execution apparatus.

In a possible design, the second power control instruction carries address identifier information of each power control instruction execution apparatus, and the address identifier information includes any one or a combination of an internet protocol IP address, a unicast media access control MAC address, a multicast or broadcast MAC address, and/or a character string corresponding to a target power control instruction execution apparatus.

In a possible design, when transparently transmitting the second power control instruction to each power control instruction execution apparatus, the power control instruction processing and forwarding apparatus in each subarray in the power plant is specifically configured to:

the power control instruction processing and forwarding apparatus in each subarray in the power plant directly delivers, through a communication network chip, the second power control instruction to a target power control instruction execution apparatus in the subarray corresponding to the power control instruction processing and forwarding apparatus. The target power control instruction execution apparatus is a power control instruction execution apparatus indicated by the address identifier information carried in the second power control instruction.

In a possible design, the power control instruction processing and forwarding apparatus includes a subarray controller or a subarray communication device;

the subarray controller is a device that is installed in the subarray and that matches a step-up transformer in the subarray, and the subarray controller includes any one or more of a subarray data acquisition apparatus, an all-in-one smart box-type transformer measurement and control apparatus, a communication management apparatus, or a protocol conversion apparatus;

the subarray communication device is any one or more of a network switch, a gateway machine, an optical fiber repeater, a bus repeater, or a bus extension apparatus; and the power control instruction execution apparatus includes a photovoltaic inverter or a power conversion system.

In a possible design, Ethernet network communication and/or field bus network communication are/is performed between the power plant-end power control apparatus and each power control instruction execution apparatus;

the Ethernet network communication is any one of generic object oriented substation event GOOSE communication or user datagram protocol UDP communication; and the field bus network communication is any one of controller area network CAN communication, Ethernet for control automation technology EtherCAT communication, or open source real-time communication technology Ethernet Powerlink communication.

In a possible design, the power plant-end power control apparatus is further configured to:

acquire the voltage analog signal of the grid-tied point of the power plant at the current moment, process the voltage analog signal of the grid-tied point at the current moment based on the instantaneous voltage amplitude calculation algorithm, to determine the instantaneous voltage amplitude of the grid-tied point at the current moment, and determine the frequency value based on the instantaneous voltage amplitude;

determine whole-plant reactive power and/or whole-plant active power of the power plant at the current moment based on the instantaneous voltage amplitude of the grid-tied point at the current moment and the frequency value; and determine whether the whole-plant reactive power and/or the whole-plant active power of the power plant at the current moment fall/falls outside a preset interval.

According to a third aspect, this application further provides an apparatus for implementing a fast power response. The apparatus is applied to a power plant-end power control apparatus in a new energy power plant. The power plant includes at least two subarrays, and the subarray includes a power control instruction processing and forwarding apparatus and at least three power control instruction execution apparatuses. The apparatus for implementing a fast power response may include at least one processor, and a memory and a communication interface that are communicatively connected to the at least one processor. The memory stores instructions that can be executed by the at least one processor. The at least one processor executes the instructions stored in the memory to perform a function of the method in any one of the first aspect or the possible designs of the first aspect.

According to a fourth aspect, this application further provides a computer storage medium. The computer storage medium includes computer instructions. When the computer instructions run on a computer, the computer is enabled to perform the method in any one of the first aspect or the possible designs of the first aspect.

According to a fifth aspect, this application further provides a computer program product. When the computer program product runs on a computer, the computer is enabled to perform the method in any one of the first aspect or the possible designs of the first aspect.

BRIEF DESCRIPTION OF DRAWINGS

FIG. 5 is a schematic flowchart of a method for implementing a fast power response according to an embodiment of this application;

DESCRIPTION OF EMBODIMENTS

Figure 1:
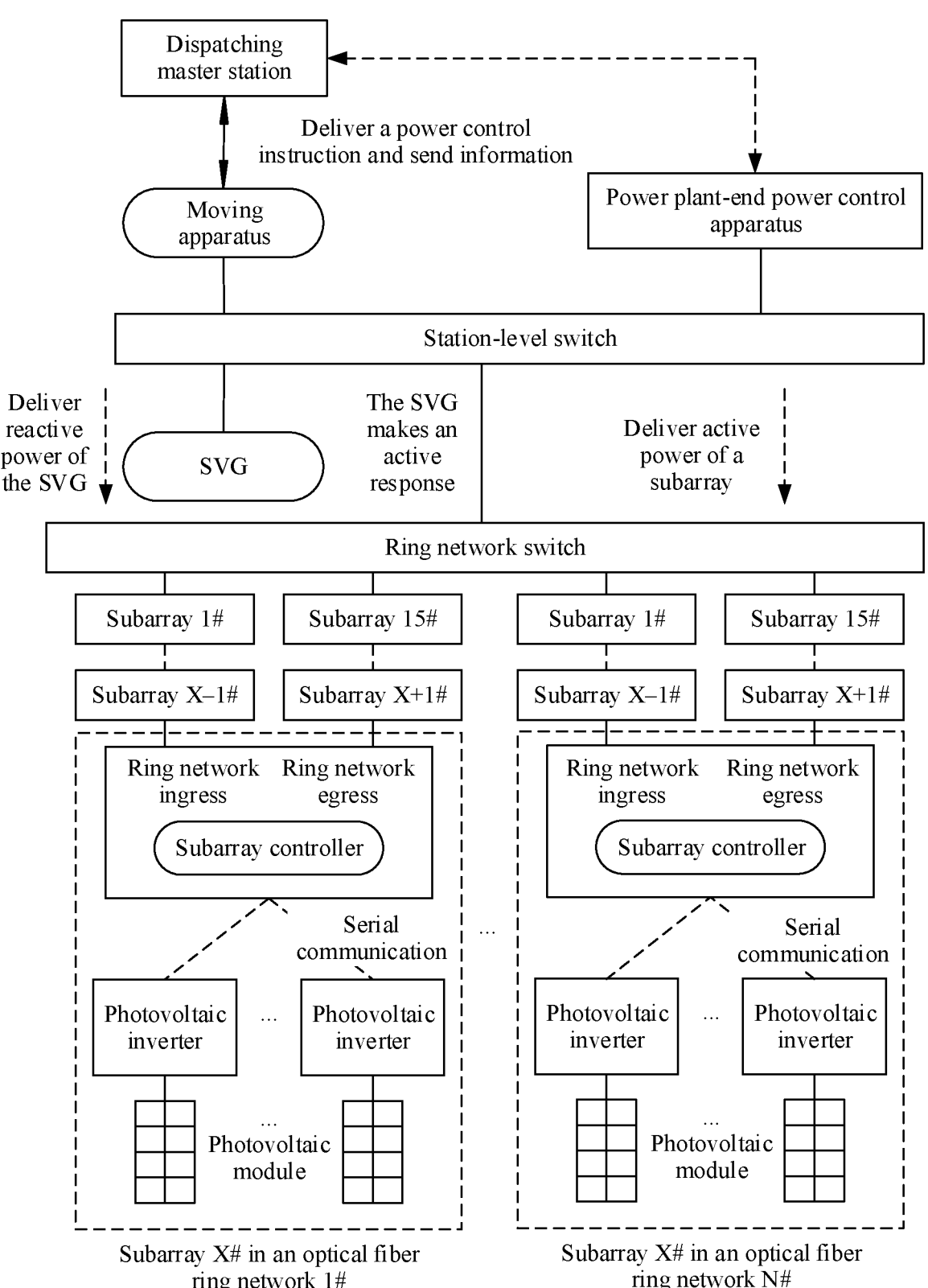
FIG. 1 is a schematic diagram of a structure of a system for implementing a fast power response of a power plant according to an embodiment of this application.

To make the objectives, technical solutions, and advantages of this application clearer, the following clearly describes the technical solutions in embodiments of this application with reference to the accompanying drawings in embodiments of this application.

To facilitate understanding of embodiments of this application, the following first explains and describes technical terms in embodiments of this application.

1. Active Power and Reactive Power

Power output by a power grid includes two parts: active power and reactive power. For the active power, electric energy is directly consumed, the electric energy is converted into mechanical energy, thermal energy, chemical energy, or sound energy, and such energy is used for working. This part of power is referred to as the active power. For the reactive power, no electric energy is consumed, but the electric energy is converted into another form of energy, such energy is an essential condition for an electrical device to work, such energy can be periodically converted into the electric energy in the power grid, and such energy is used for working. This part of power is referred to as the reactive power, for example, electric energy occupied by an electromagnetic element to establish a magnetic field and electric energy occupied by a capacitive element to establish an electric field.

2. Reactive Power Compensation

Reactive power compensation, is a technology that increases a power factor of a power grid, reduces losses of a power supply transformer and a transmission line, improves power supply efficiency, and improves a power supply environment in a power supply system. Therefore, a reactive power compensation device is at an indispensable and very important position in the power supply system. If the reactive power compensation device is properly selected, a loss of the power grid can be reduced, and quality of the power grid can be improved. On the contrary, if the reactive power compensation device is improperly selected or used, voltage fluctuation may occur in the power supply system, and consequently a loss of the power grid is increased, and quality of the power grid is degraded.

Currently, there are mainly the following several types of reactive power compensation devices: a static var generator (static var generator, SVG), a static var compensator (static var compensator, SVC), a magnetically controlled reactor (magnetically controlled reactor, MCR), a thyristor controlled reactor (thyristor controlled reactor, TCR), and a thyristor switched capacitor (thyristor switched capacitor, TSC). Considering that a dynamic reactive power compensation response time of the reactive power compensation device is required to be not greater than 30 milliseconds in a national standard, only the SVG in the foregoing several types of reactive power compensation devices can well meet the related requirement. Therefore, in power grids in many areas of China, the SVG is listed as an essential device for new energy grid connection, and it is a mandatory requirement to configure the SVG for each power plant.

3. Static Var Generator (Static Var Generator, SVG)

The SVG is also referred to as a high-voltage dynamic reactive power compensation generator or a static synchronous compensator, and is an apparatus that performs dynamic reactive power compensation by using a self-commutated power semiconductor bridge converter. The SVG currently is a best solution in the field of reactive power control. For example, a reactive power compensation device in China basically performs reactive power compensation by using a capacitor, a power factor existing after compensation usually ranges from 0.8 to 0.9, and it takes at least 200 milliseconds for the reactive power compensation device in China to complete compensation for one time. However, the SVG performs reactive power compensation by using a power module, a power factor existing after compensation is usually greater than 0.98, and the SVG may complete compensation for one time in 5-20 milliseconds.

A photovoltaic inverter and a power conversion system that are insulated gate bipolar transistor (insulated gate bipolar transistor, IGBT) devices like the SVG also have a function of outputting inductive reactive power and capacitive reactive power. Therefore, currently, when the requirement that the dynamic reactive power compensation response time of the reactive power compensation device is not greater than 30 milliseconds needs to be met, a reactive power response of a power plant may be completely borne by the SVG, or may be jointly borne by the SVG and the photovoltaic inverter or the power conversion system; or when the requirement that the dynamic reactive power compensation response time of the reactive power compensation device is not greater than 30 milliseconds does not need to be met, a reactive power response of a power plant may be completely borne by the photovoltaic inverter or the power conversion system.

For example, FIG. 1 is a schematic diagram of a structure of a system for implementing a fast power response of a power plant according to an embodiment of this application. The system includes a dispatching master station, a moving apparatus, a power plant-end power control apparatus, a station-level switch, an SVG, a ring network switch, and a plurality of subarrays. The dispatching master station is an upper-level system of the power plant, and is configured to: remotely monitor a power plant end, deliver a power control instruction to the power plant end, and receive, analyze, and process information sent by the moving apparatus. The moving apparatus is disposed at the power plant end, and is configured to: receive the power control instruction delivered by the dispatching master station, and control a device action. The moving apparatus is further configured to: analyze and process information of the power plant end, and send processed information to the dispatching master station. The power plant-end power control apparatus is disposed at the power plant end, and is configured to: receive the power control instruction delivered by the dispatching master station or locally generate a power control instruction, and deliver the received or generated power control instruction to the subarray, so that a photovoltaic inverter in the subarray makes a power response based on the power control instruction. The SVG is disposed at the power plant end, and is configured to make a reactive power response under control of the moving apparatus or the power plant-end power control apparatus. The station-level switch and the ring network switch are configured to provide an electrical signal path for any two network nodes accessing the switch, for example, provide an electrical signal path for the moving apparatus and the SVG, the power plant-end power control apparatus and the SVG, and the power plant-end power control apparatus and the subarray. A reactive power response of the power plant in the system is completely borne by the SVG, and the photovoltaic inverter in the subarray in the power plant bears only an active power response function, and does not participate in reactive power regulation. In this case, although the SVG can meet the requirement that the dynamic reactive power compensation response time of the reactive power compensation device is not greater than 30 milliseconds, the SVG has problems such as high initial construction investment costs, high power consumption, and high operation and maintenance costs.

Figure 2:
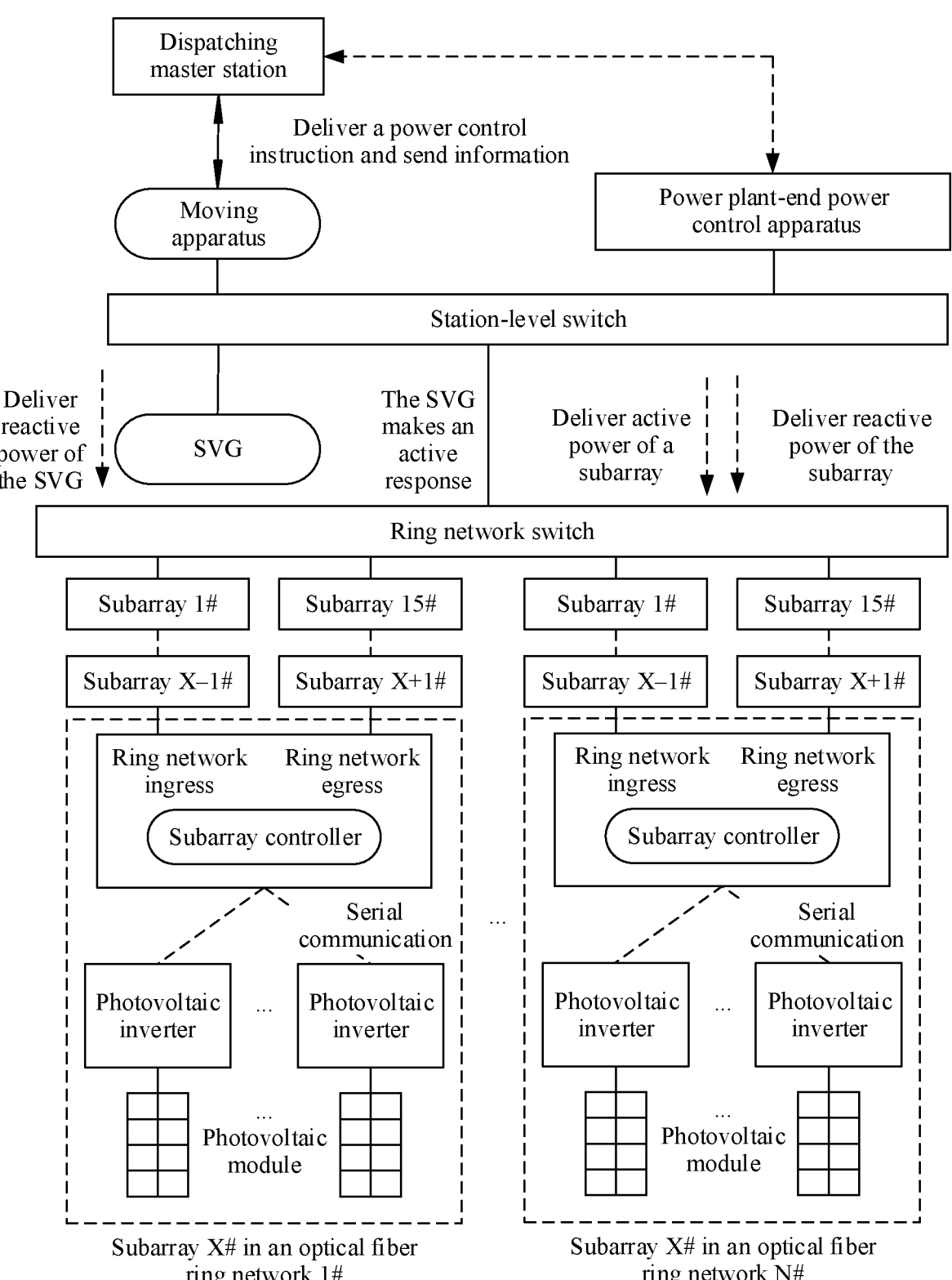
FIG. 2 is another schematic diagram of a structure of a system for implementing a fast power response of a power plant according to an embodiment of this application.

For example, FIG. 2 is another schematic diagram of a structure of a system for implementing a fast power response of a power plant according to an embodiment of this application. The system includes a dispatching master station, a moving apparatus, a power plant-end power control apparatus, a station-level switch, an SVG, a ring network switch, and a plurality of subarrays. The dispatching master station is an upper-level system of the power plant, and is configured to: remotely monitor a power plant end, deliver a power control instruction to the power plant end, and receive, analyze, and process information sent by the moving apparatus. The moving apparatus is disposed at the power plant end, and is configured to: receive the power control instruction delivered by the dispatching master station, and control a device action. The moving apparatus is further configured to: analyze and process information of the power plant end, and send processed information to the dispatching master station. The power plant-end power control apparatus is disposed at the power plant end, and is configured to: receive the power control instruction delivered by the dispatching master station or locally generate a power control instruction, and deliver the received or generated power control instruction to the subarray, so that a photovoltaic inverter in the subarray makes a power response based on the power control instruction. The SVG is disposed at the power plant end, and is configured to make a reactive power response under control of the moving apparatus or the power plant-end power control apparatus. The station-level switch and the ring network switch are configured to provide an electrical signal path for any two network nodes accessing the switch, for example, provide an electrical signal path for the moving apparatus and the SVG, the moving apparatus and the subarray, the power plant-end power control apparatus and the SVG, and the power plant-end power control apparatus and the subarray. A reactive power response of the power plant in the system is jointly borne by the SVG and the photovoltaic inverter. Specifically, when voltage disturbance occurs in a power grid, the power plant first performs fast reactive power coordinated control by using the SVG, to participate in voltage regulation of the power grid. After the reactive power response of the power plant is stable, the power plant dispatches reactive power of the photovoltaic inverter or a power conversion system to slowly replace reactive power of the SVG in a time period of several seconds or even more than ten seconds, so that the SVG maintains a specific reactive power capacity, to meet a requirement for a next fast reactive power response. In this case, although the SVG can meet the requirement that the dynamic reactive power compensation response time of the reactive power compensation device is not greater than 30 milliseconds, the SVG has problems such as high initial construction investment costs, high power consumption, and high operation and maintenance costs. In addition, the photovoltaic inverter or the power conversion system usually performs communication based on a serial port, and a small quantity of centralized photovoltaic inverters or power conversion systems perform communication based on a network port, and therefore it may take several seconds to more than ten seconds or even a longer time from sending of a reactive power dispatch command by the power plant to completion of response execution by the photovoltaic inverter or the power conversion system.

Figure 3:
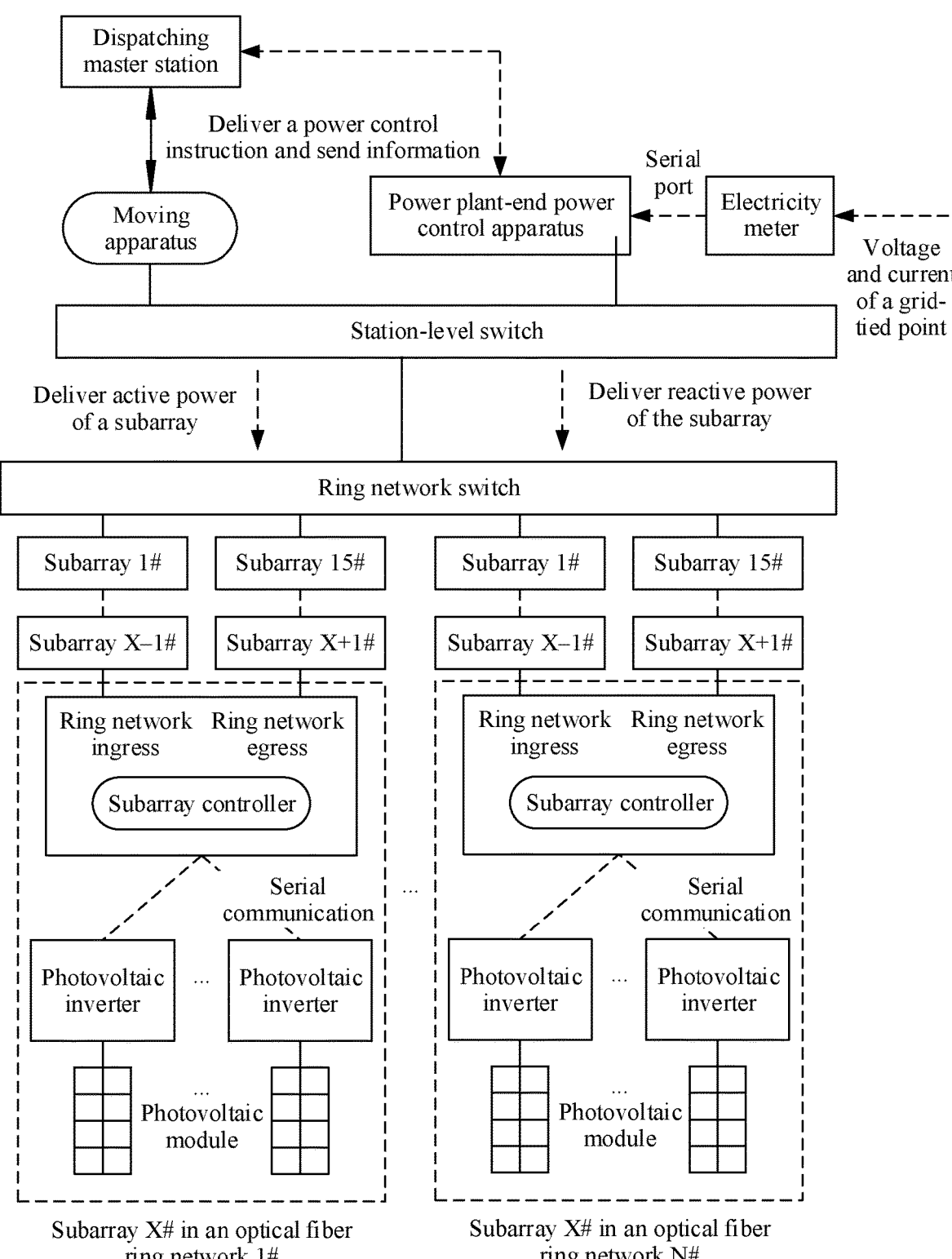
FIG. 3 is still another schematic diagram of a structure of a system for implementing a fast power response of a power plant according to an embodiment of this application.

For example, FIG. 3 is still another schematic diagram of a structure of a system for implementing a fast power response of a power plant according to an embodiment of this application. The system includes a dispatching master station, a moving apparatus, a power plant-end power control apparatus, an electricity meter, a station-level switch, a ring network switch, and a plurality of subarrays. The dispatching master station is an upper-level system of the power plant, and is configured to: remotely monitor a power plant end, deliver a power control instruction to the power plant end, and receive, analyze, and process information sent by the moving apparatus. The moving apparatus is disposed at the power plant end, and is configured to: receive the power control instruction delivered by the dispatching master station, and control a device action. The moving apparatus is further configured to: analyze and process information of the power plant end, and send processed information to the dispatching master station. The power plant-end power control apparatus is disposed at the power plant end, and is configured to: receive the power control instruction delivered by the dispatching master station or locally generate a power control instruction, and deliver the received or generated power control instruction to the subarray, so that a photovoltaic inverter in the subarray makes a power response based on the power control instruction. The electricity meter is configured to: acquire a voltage and a current of a grid-tied point of the power plant at a current moment, and send the acquired voltage and current to the power plant-end power control apparatus through a serial port. The station-level switch and the ring network switch are configured to provide an electrical signal path for any two network nodes accessing the switch, for example, provide an electrical signal path for the moving apparatus and the subarray, and the power plant-end power control apparatus and the subarray. A reactive power response of the power plant in the system is completely borne by the photovoltaic inverter or a power conversion system. Specifically, when voltage disturbance occurs in a power grid, the power plant-end power control apparatus in the power plant may receive a power control instruction that includes a whole-plant reactive power target value and that is delivered by the upper-level system, or calculate a whole-plant reactive power target value based on the voltage that is of the grid-tied point of the power plant at the current moment and that is acquired by the electricity meter, decompose the whole-plant reactive power target value into each subarray reactive power target value, and send a power control instruction that includes each subarray reactive power target value to each subarray data acquisition apparatus by using a transmission control protocol (transmission control protocol, TCP) or an internet protocol (internet protocol, IP), and each subarray data acquisition apparatus decomposes each subarray reactive power target value into a reactive power target value of each photovoltaic inverter or power conversion system, so that each photovoltaic inverter or power conversion system outputs corresponding reactive power, and participates in voltage regulation of the power grid. In this case, the photovoltaic inverter or the power conversion system usually performs communication based on a serial port, and a small quantity of centralized photovoltaic inverters or power conversion systems perform communication based on a network port, and therefore it may take several seconds to more than ten seconds or even a longer time from sending of a reactive power dispatch command by the power plant to completion of response execution by the photovoltaic inverter or the power conversion system.

It can be learned that currently, when fast reactive power coordinated control is performed by using the SVG, there are problems such as high initial construction investment costs, high power consumption, and high operation and maintenance costs. When fast reactive power coordinated control is performed by using the photovoltaic inverter or the power conversion system, a currently implemented communication and control technology cannot meet the requirement that the dynamic reactive power compensation response time of the reactive power compensation device is not greater than 30 milliseconds. Therefore, it is an important development direction of the industry to find a dynamic reactive power compensation resource that can meet the requirement of the 30-millisecond dynamic reactive power compensation response time in the national standard and that is good in economy and high in reliability.

In view of this, embodiments of this application provide a method for implementing a fast power response, to meet a requirement that a dynamic reactive power compensation response time of a reactive power compensation device is not greater than 30 milliseconds in a national standard, and implement good economy and high reliability.

It should be understood that embodiments of this application may be applied to a new energy power plant. The new energy power plant may be a photovoltaic power plant, an energy storage power plant, a photovoltaic energy storage power plant, or a hybrid power plant including another new energy manner (for example, wind power). This is not specifically limited in embodiments of this application. For ease of description, an example in which the new energy power plant is a photovoltaic power plant or an energy storage power plant is used in embodiments of this application. The new energy power plant includes a power plant-end power control apparatus and at least two subarrays. Each subarray includes one subarray controller, one subarray communication device, and at least three photovoltaic inverters or power conversion systems. The power plant-end power control apparatus is configured to deliver a power control instruction to the photovoltaic inverter or the power conversion system, so that the photovoltaic inverter or the power conversion system makes a power response (that is, implements the method in embodiments of this application) based on the power control instruction.

The power plant-end power control apparatus may be a power plant controller (power plant controller, PPC), a power generator controller (power generator controller, PGC), a new energy frequency modulation or voltage regulation apparatus, an automatic generation control (automatic generation control, AGC) or automatic voltage control (automatic voltage control, AVC) system, a supervisory control and data acquisition (supervisory control and data acquisition, SCADA) system, or another system that can perform coordinated control on whole-plant power. This is not specifically limited in this embodiment of this application.

The subarray communication device in each subarray is a subarray device having only a communication function. The subarray communication device is any one or more of a network switch, a gateway machine, an optical fiber repeater, a bus repeater, or a bus extension apparatus. This is not specifically limited in this embodiment of this application. The subarray controller is a subarray device that has a communication and control function and that matches a step-up transformer in the subarray, and the subarray controller is any one or more of a subarray data acquisition apparatus, an all-in-one smart box-type transformer measurement and control apparatus, a communication management apparatus, or a protocol conversion apparatus. This is not specifically limited in this embodiment of this application.

The photovoltaic inverter or the power conversion system may be a string photovoltaic inverter or power conversion system, a centralized photovoltaic inverter or power conversion system, a distributed photovoltaic inverter or power conversion system, or a bidirectional photovoltaic inverter or power conversion system. This is not specifically limited in this embodiment of this application.

Figure 4:
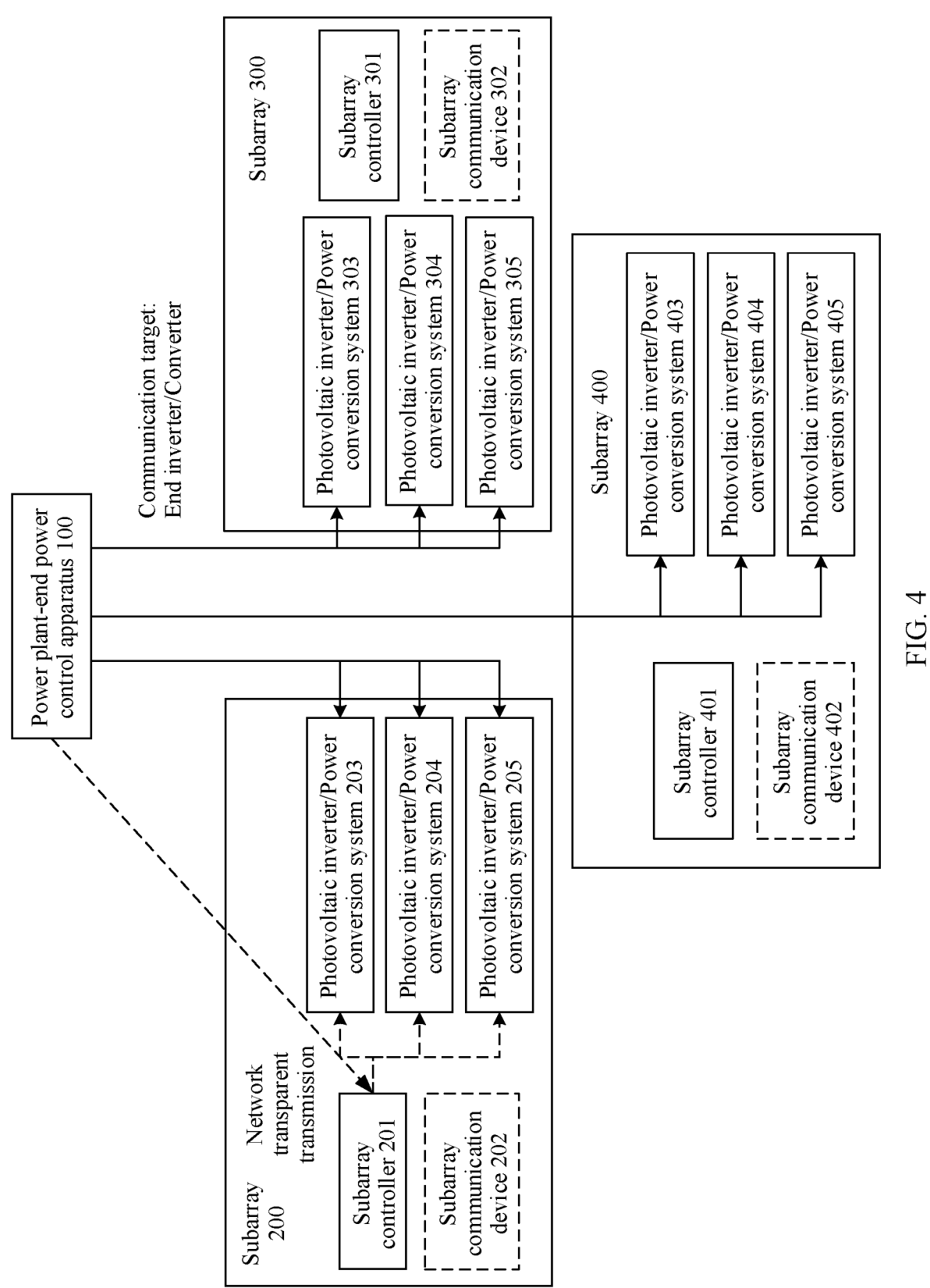
FIG. 4 is a schematic diagram of a structure of a new energy power plant according to an embodiment of this application.

For example, FIG. 4 is a schematic diagram of a structure of a new energy power plant according to an embodiment of this application. The new energy power plant includes a power plant-end power control apparatus 100, and may further include a plurality of subarrays. Each subarray includes one subarray controller, one subarray communication device, and at least three photovoltaic inverters or power conversion systems. In FIG. 4, three subarrays, namely, a subarray 200, a subarray 300, and a subarray 400, are drawn as an example. The subarray 200 includes a subarray controller 201, a subarray communication device 202, a photovoltaic inverter or a power conversion system 203, a photovoltaic inverter or a power conversion system 204, and a photovoltaic inverter or a power conversion system 205. In FIG. 4, a dashed line indicates that the subarray communication device 202 is optional for the subarray 200. The subarray 300 includes a subarray controller 301, a subarray communication device 302, a photovoltaic inverter or a power conversion system 303, a photovoltaic inverter or a power conversion system 304, and a photovoltaic inverter or a power conversion system 305. In FIG. 4, a dashed line indicates that the subarray communication device 302 is optional for the subarray 300. The subarray 400 includes a subarray controller 401, a subarray communication device 402, a photovoltaic inverter or a power conversion system 403, a photovoltaic inverter or a power conversion system 404, and a photovoltaic inverter or a power conversion system 405. In FIG. 4, a dashed line indicates that the subarray communication device 402 is optional for the subarray 400. In the architecture of the new energy power plant shown in FIG. 4, only an example in which the photovoltaic inverter or the power conversion system 203, the photovoltaic inverter or the power conversion system 204, the photovoltaic inverter or the power conversion system 205, the photovoltaic inverter or the power conversion system 303, the photovoltaic inverter or the power conversion system 304, the photovoltaic inverter or the power conversion system 305, the photovoltaic inverter or the power conversion system 403, the photovoltaic inverter or the power conversion system 404, or the photovoltaic inverter or the power conversion system 405 is a string photovoltaic inverter or a power conversion system is used. A specific form of the photovoltaic inverter or the power conversion system included in the new energy power plant is not limited in this embodiment of this application.

The foregoing describes the new energy power plant provided in embodiments of this application. The following describes, with reference to the accompanying drawings, the method for implementing a fast power response provided in embodiments of this application.

It should be understood that the terms "first" and "second" in embodiments of this application are merely used for a purpose of description, and cannot be understood as an indication or implication of relative importance or an implicit indication of a quantity of indicated technical features. Therefore, a feature limited by "first" or "second" may explicitly or implicitly include one or more features. "At least one" means one or more, and "a plurality of" means two or more. The term "and/or" describes an association relationship between associated objects, and indicates that three relationships may exist. For example, A and/or B may indicate the following three cases: Only A exists, both A and B exist, and only B exists, where A and B may be singular or plural. The character "I" usually indicates an "or" relationship between associated objects. "At least one of the following items (pieces)" or a similar expression thereof refers to any combination of these items, including a single item (piece) or any combination of a plurality of items (pieces). For example, at least one of a, b, or c may indicate a, b, c, a and b, a and c, b and c, or a, b, and c.

FIG. 5 is a schematic flowchart of a method for implementing a fast power response according to an embodiment of this application. The method for implementing a fast power response may be applied to the new energy power plant shown in FIG. 4 or a new energy power plant having a functional structure similar to that in FIG. 4. A specific procedure of the method for implementing a fast power response is described as follows:

S501: Determine a whole-plant reactive power target value and/or a whole-plant active power target value of the power plant based on a first power control instruction delivered by an upper-level system or an acquired voltage analog signal and current analog signal of a grid-tied point of the power plant at a current moment.

In some embodiments, after receiving the first power control instruction delivered by the upper-level system, a power plant-end power control apparatus 100 may determine the whole-plant reactive power target value and/or the whole-plant active power target value of the power plant based on the first power control instruction.

For example, if the first power control instruction delivered by the upper-level system to the power plant-end power control apparatus 100 includes the whole-plant reactive power target value, the whole-plant reactive power target value of the power plant is determined based on the first power control instruction; if the first power control instruction delivered by the upper-level system to the power plant-end power control apparatus 100 includes the whole-plant active power target value, the whole-plant active power target value of the power plant is determined based on the first power control instruction; or if the first power control instruction delivered by the upper-level system to the power plant-end power control apparatus 100 includes the whole-plant reactive power target value and the whole-plant active power target value, the whole-plant reactive power target value and the whole-plant active power target value of the power plant are determined based on the first power control instruction.

In some other embodiments, after acquiring the voltage analog signal and the current analog signal of the grid-tied point of the power plant at the current moment by using a potential transformer (potential transformer, PT) and a current transformer (current transformer, CT), a power plant-end power control apparatus 100 may determine the whole-plant reactive power target value and/or the whole-plant active power target value of the power plant based on the voltage analog signal and the current analog signal of the grid-tied point of the power plant at the current moment. A sampling frequency for acquiring the voltage analog signal and the current analog signal of the grid-tied point of the power plant at the current moment needs to be not less than 1200 Hz, and there may be one or more sampling points. This is not specifically limited in this embodiment of this application. However, to improve reliability, two or three sampling points are used as an example in this embodiment of this application.

For example, after acquiring the voltage analog signal of the grid-tied point of the power plant at the current moment by using the PT, the power plant-end power control apparatus 100 may first process the voltage analog signal of the grid-tied point of the power plant at the current moment based on an instantaneous voltage amplitude calculation algorithm, to determine an instantaneous voltage amplitude of the grid-tied point of the power plant at the current moment. A calculation frequency for calculating the instantaneous voltage amplitude of the grid-tied point of the power plant at the current moment needs to be not less than 1200 Hz. The instantaneous voltage amplitude calculation algorithm may be an $\alpha\beta$ transformation method for constructing a two-phase voltage by delaying a single-phase voltage by 90°, or a dq0 transformation method based on an instantaneous reactive power theory. This is not specifically limited in this embodiment of this application. For example, the voltage analog signal of the grid-tied point of the power plant at the current moment is processed, to obtain a three-phase instantaneous voltage amplitude acquired at a same time section, and three-phase coordinates are transformed into two-phase coordinates by using the $\alpha\beta$ transformation method, so that the instantaneous voltage amplitude U of the grid-tied point of the power plant at the current moment is directly determined without performing time integral accumulation calculation. Then, the whole-plant reactive power target value of the power plant is determined based on the instantaneous voltage amplitude of the grid-tied point of the power plant at the current moment. For example, the whole-plant reactive power target value Q of the power plant is determined based on the instantaneous voltage amplitude U of the grid-tied point of the power plant at the current moment by using a Q-U curve or a related Q-U empirical calculation formula.

It should be noted that in this embodiment of this application, to prevent impact of impulse interference, a plurality of continuous instantaneous voltage amplitude sampling points, for example, two or three continuous instantaneous voltage amplitude sampling points, need to be obtained. An average value of the plurality of instantaneous voltage amplitude sampling points is calculated, a point whose deviation from the average value exceeds a preset interval (for example, 5% to 10%) is eliminated from the plurality of instantaneous voltage amplitude sampling points, a weighted average value of remaining points is determined in a manner in which a time closer to the current moment corresponds to a larger weighting coefficient, and the weighted average value is used as the instantaneous voltage amplitude of the grid-tied point of the power plant at the current moment.

It should be noted that in this embodiment of this application, when the voltage analog signal of the grid-tied point of the power plant at the current moment is processed based on the instantaneous voltage amplitude calculation algorithm, to determine the instantaneous voltage amplitude of the grid-tied point of the power plant at the current moment, the instantaneous voltage amplitude of the grid-tied point of the power plant at the current moment may be further determined based on both a semi-cycle Fourier calculation algorithm and a full-cycle Fourier calculation algorithm, so that when a voltage suddenly changes, instantaneous voltage amplitudes that are of the grid-tied point of the power plant at the current moment and that are determined by using different calculation algorithms are separately output, to reduce an instantaneous voltage amplitude calculation error.

Based on the technical solution, the instantaneous voltage amplitude of the grid-tied point of the power plant at the current moment is quickly acquired and calculated. Two or three sampling points are used as an example. It takes only 2-3 milliseconds for the power plant-end power control apparatus 100 to acquire the voltage analog signal of the grid-tied point of the power plant at the current moment and process the voltage analog signal of the grid-tied point of the power plant at the current moment based on the instantaneous voltage amplitude calculation algorithm, to determine the instantaneous voltage amplitude of the grid-tied point of the power plant at the current moment. Compared with a case in which when the instantaneous voltage amplitude of the grid-tied point of the power plant at the current moment is conventionally determined based on a third-party electricity meter, it needs to take at least milliseconds for the electricity meter to calculate the voltage amplitude, and it needs to take 500 milliseconds or even a longer time to transmit a result to the power plant-end power control apparatus through a serial port, or the power plant-end power control apparatus 100 acquires only the voltage analog signal of the grid-tied point of the power plant at the current moment, but it usually needs to take a cycle time, namely, 20 milliseconds, to process the voltage analog signal of the grid-tied point of the power plant at the current moment based on a conventional Fourier calculation algorithm, to determine the instantaneous voltage amplitude of the grid-tied point of the power plant at the current moment, in this embodiment of this application, only 2-3 milliseconds is consumed, and space of approximately 27 milliseconds is reserved for a subsequent step, to reserve technical feasibility for implementing a 30-millisecond reactive power response based on the photovoltaic inverter or the power conversion system.

For example, the power plant-end power control apparatus 100 may further process the voltage analog signal and the current analog signal of the grid-tied point at the current moment based on an instantaneous amplitude calculation algorithm, to determine instantaneous active power of the grid-tied point at the current moment, and determine the whole-plant active power target value of the power plant based on the instantaneous active power at the current moment and a frequency value.

It should be noted that in this embodiment of this application, before determining the whole-plant reactive power target value and/or the whole-plant active power target value of the power plant, the power plant-end power control apparatus 100 may further acquire the voltage analog signal of the grid-tied point of the power plant at the current moment, and process the voltage analog signal of the grid-tied point at the current moment based on the instantaneous voltage amplitude calculation algorithm, to determine the instantaneous voltage amplitude of the grid-tied point at the current moment; then determine whole-plant reactive power and/or whole-plant active power of the power plant at the current moment based on the instantaneous voltage amplitude of the grid-tied point at the current moment and the frequency value; determine whether the whole-plant reactive power and/or the whole-plant active power of the power plant at the current moment fall/falls within a preset interval; and if the whole-plant reactive power and/or the whole-plant active power of the power plant at the current moment fall/falls outside the preset interval, determine the whole-plant reactive power target value and/or the whole-plant active power target value of the power plant.

S502: Determine, based on the whole-plant reactive power target value and/or the whole-plant active power target value, a second power control instruction readable to each photovoltaic inverter or power conversion system in the power plant.

In some embodiments, after determining the whole-plant reactive power target value and/or the whole-plant active power target value of the power plant, the power plant-end power control apparatus 100 may determine, based on the whole-plant reactive power target value and/or the whole-plant active power target value, the second power control instruction readable to each photovoltaic inverter or power conversion system in the power plant. The second power control instruction indicates a power target value of each photovoltaic inverter or power conversion system existing when the whole-plant reactive power target value and/or the whole-plant active power target value are/is reached. The second power control instruction carries address identifier information of each photovoltaic inverter or power conversion system, so that after the power plant-end power control apparatus 100 delivers the second power control instruction to a subarray controller or a subarray communication device in the power plant, the subarray controller or the subarray communication device in the power plant may determine a target photovoltaic inverter or a target power conversion system based on the address identifier information carried in the second power control instruction, and then deliver the second power control instruction to the target photovoltaic inverter or the target power conversion system in a subarray corresponding to the subarray controller or the subarray communication device.

It should be noted that in this embodiment of this application, the power target value of each photovoltaic inverter or power conversion system may be a power target absolute value, a power target percentage value, a variation absolute value, or a variation percentage value. This is not specifically limited in this embodiment of this application. The power target percentage value is a percentage value between the power target absolute value and rated power of the photovoltaic inverter or power conversion system. For example, if a power target absolute value of a photovoltaic inverter is 80 kW, and rated power of the photovoltaic inverter is 100 kW, a power target percentage value of the photovoltaic inverter is 80%. The variation absolute value is an absolute difference between the power target absolute value and power of the photovoltaic inverter or power conversion system at the current moment. For example, if a power target absolute value of a photovoltaic inverter is 80 kW, and power of the photovoltaic inverter at the current moment is 60 kW, a variation absolute value of the photovoltaic inverter is 20 kW. The variation percentage value is a percentage value between the variation absolute value and the rated power of the photovoltaic inverter or power conversion system. For example, if a variation absolute value of a photovoltaic inverter is 20 kW, and rated power of the photovoltaic inverter is 100 kW, a variation percentage value of the photovoltaic inverter is 20%.

It should be noted that in this embodiment of this application, the address identifier information of each photovoltaic inverter or power conversion system carried in the second power control instruction may include any one or a combination of an IP address, a unicast media access control (media access control a character string corresponding to the target photovoltaic inverter or the target power conversion system. This is not specifically limited in this embodiment of this application.

For example, after determining the whole-plant reactive power target value of the power plant, the power plant-end power control apparatus 100 may distribute the whole-plant reactive power target value to each photovoltaic inverter or power conversion system in the power plant through even distribution or through differentiated distribution based on a reactive power output capability of each photovoltaic inverter or power conversion system. For example, the whole-plant reactive power target value is evenly distributed to each photovoltaic inverter or power conversion system in the power plant, and the power target value of each photovoltaic inverter or power conversion system is the power target percentage value. To achieve a whole-plant reactive power target value of 30 MW, if a total capacity of the whole plant is 100 MW, the rated power of each photovoltaic inverter or power conversion system is 100 kW, there are 1000 photovoltaic inverters or power conversion systems in the whole plant, and nine photovoltaic inverters or power conversion systems in FIG. 4 are merely some of the photovoltaic inverters or power conversion systems in the whole plant, the nine photovoltaic inverters or power conversion systems in FIG. 4 need to reach a whole-plant reactive power target value of 270 kW. Therefore, the power plant-end power control apparatus 100 may determine that reactive power target values of a photovoltaic inverter or power conversion system 203, a photovoltaic inverter or power conversion system 204, and a photovoltaic inverter or power conversion system 205 in a subarray 200 are all 30%, reactive power target values of a photovoltaic inverter or power conversion system 303, a photovoltaic inverter or power conversion system 304, and a photovoltaic inverter or power conversion system 305 in a subarray 300 are all 30%, and reactive power target values of a photovoltaic inverter or power conversion system 403, a photovoltaic inverter or power conversion system 404, and a photovoltaic inverter or power conversion system 405 in a subarray 400 are all 30%. The second power control instruction readable to each photovoltaic inverter or power conversion system in the power plant is determined based on the distribution result. The second power control instruction indicates that the reactive power target values of the photovoltaic inverter or power conversion system 203, the photovoltaic inverter or power conversion system 204, the photovoltaic inverter or power conversion system 205, the photovoltaic inverter or power conversion system 303, the photovoltaic inverter or power conversion system 304, the photovoltaic inverter or power conversion system 305, the photovoltaic inverter or power conversion system 403, the photovoltaic inverter or power conversion system 404, and the photovoltaic inverter or power conversion system 405 are all 30%. The second power control instruction carries address identifier information of the photovoltaic inverter or power conversion system 203, the photovoltaic inverter or power conversion system 204, the photovoltaic inverter or power conversion system 205, the photovoltaic inverter or power conversion system 303, the photovoltaic inverter or power conversion system 304, the photovoltaic inverter or power conversion system 305, the photovoltaic inverter or power conversion system 403, the photovoltaic inverter or power conversion system 404, and the photovoltaic inverter or power conversion system 405.

S503: Transparently transmit the second power control instruction to each photovoltaic inverter or power conversion system through a subarray controller or a subarray communication device in the power plant, so that each photovoltaic inverter or power conversion system makes a power response based on the second power control instruction.

In some embodiments, after determining the second power control instruction readable to each photovoltaic inverter or power conversion system (for example, the photovoltaic inverter or power conversion system 203 in the subarray 200, the photovoltaic inverter or power conversion system 303, the photovoltaic inverter or power conversion system 304, and the photovoltaic inverter or power conversion system 305 in the subarray 300, and the photovoltaic inverter or power conversion system 403 in the subarray 400) in the power plant, the power plant-end power control apparatus 100 may transparently transmit the second power control instruction to the photovoltaic inverter or the power conversion system in each subarray through the subarray controller or the subarray communication device (for example, a subarray controller 201 or a subarray communication device 202 in the subarray 200, a subarray controller 301 or a subarray communication device 302 in the subarray 300, or a subarray controller 401 or a subarray communication device 402 in the subarray 400) in the power plant, so that the photovoltaic inverter or the power conversion system in each subarray may make a power response based on the second power control instruction.

It should be noted that in this embodiment of this application, after the power plant-end power control apparatus 100 delivers the second power control instruction to the subarray controller or the subarray communication device in the plant, the subarray controller or the subarray communication device does not process or decompose the second power control instruction through a central processing unit (central processing unit, CPU), but directly delivers the second power control instruction to a target photovoltaic inverter or a target power conversion system in a subarray corresponding to the subarray controller or the subarray communication device through a communication network chip. The target photovoltaic inverter or the target power conversion system is the photovoltaic inverter or the power conversion system indicated by the address identifier information carried in the second power control instruction.

For example, when receiving the second power control instruction delivered by the power plant-end power control apparatus 100, the subarray controller 201 or the subarray communication device 202 in the subarray 200 may determine a target photovoltaic inverter or a target power conversion system in the subarray 200 based on the address identifier information carried in the second power control instruction. For example, if the second power control instruction carries address identifier information of the photovoltaic inverter or power conversion system 203, the photovoltaic inverter or power conversion system 303, the photovoltaic inverter or power conversion system 304, the photovoltaic inverter or power conversion system 305, and the photovoltaic inverter or power conversion system 403, the subarray controller 201 or the subarray communication device 202 may determine, based on the second power control instruction, that the target photovoltaic inverter or the target power conversion system in the subarray 200 is the photovoltaic inverter or power conversion system 203, and the subarray controller 201 or the subarray communication device 202 does not process or decompose the second power control instruction through the CPU, but directly delivers the second power control instruction to the photovoltaic inverter or power conversion system 203 in the subarray 200 through the communication network chip.

It should be noted that in this embodiment of this application, Ethernet network communication, field bus network communication, or Ethernet network communication and field bus network communication may be performed between the power plant-end power control apparatus 100 and each photovoltaic inverter or power conversion system. The Ethernet network communication may be generic object oriented substation event (generic object oriented substation event, GOOSE) communication or user datagram protocol (user datagram protocol, UDP) communication, and the field bus network communication may be controller area network (controller area network, CAN) communication, Ethernet for control automation technology (EtherCAT) communication, open source real-time communication technology (Ethernet Powerlink) communication, or process field bus-decentralized periphery (process field bus-decentralized periphery, Profibus-DP) communication. This is not specifically limited in this embodiment of this application.

Figure 6A:
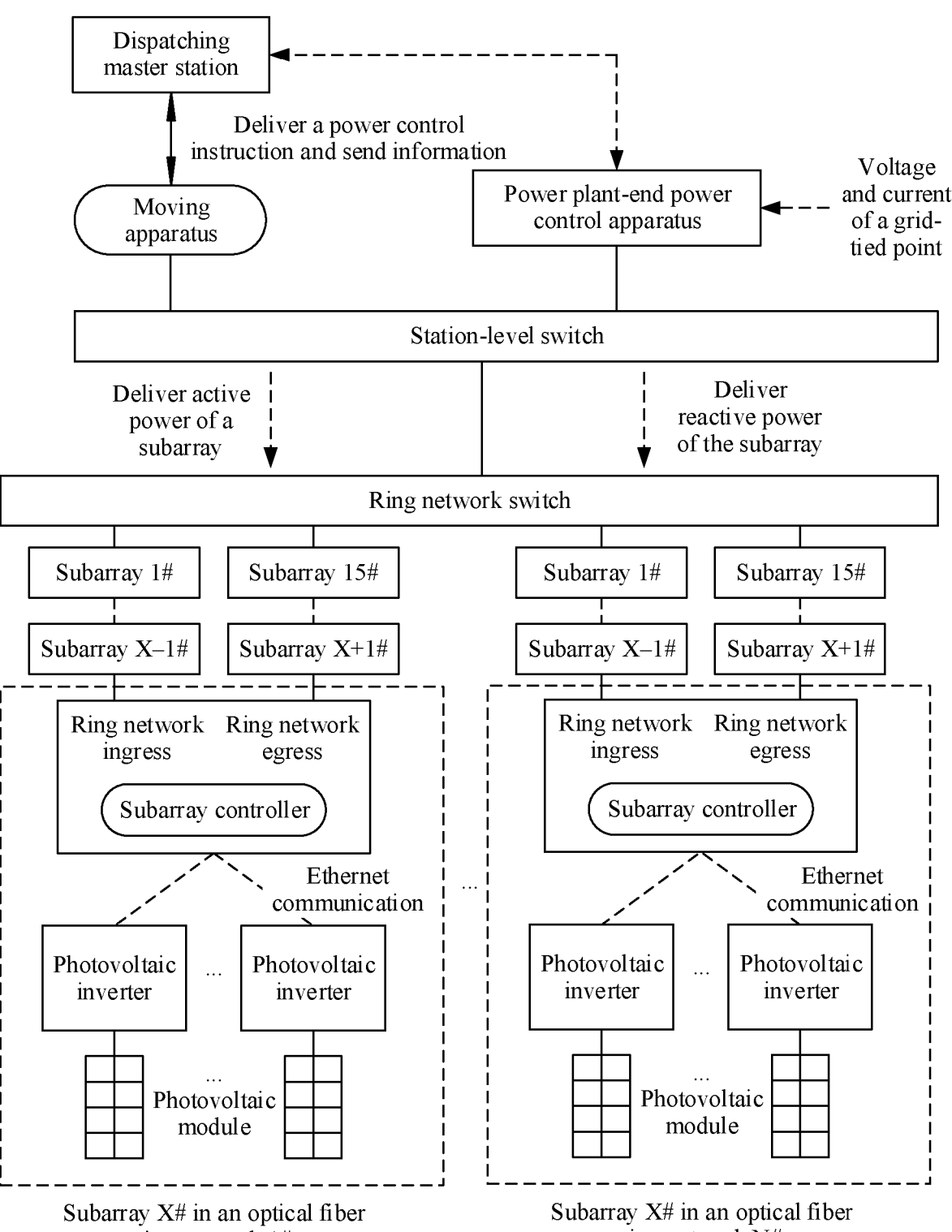
FIG. 6a is a schematic diagram of transparently transmitting, by a power plant-end power control apparatus, a power control instruction to each photovoltaic inverter or power conversion system according to an embodiment of this application.

For example, FIG. 6a is a schematic diagram of transparently transmitting, by a power plant-end power control apparatus, a power control instruction to each photovoltaic inverter or power conversion system according to an embodiment of this application. Ethernet network communication is performed between the power plant-end power control apparatus and each subarray controller or subarray communication device, and between each subarray controller or subarray communication device and a target photovoltaic inverter or a target power conversion system in a corresponding subarray. The Ethernet network communication is GOOSE communication or UDP communication.

Figure 6B:
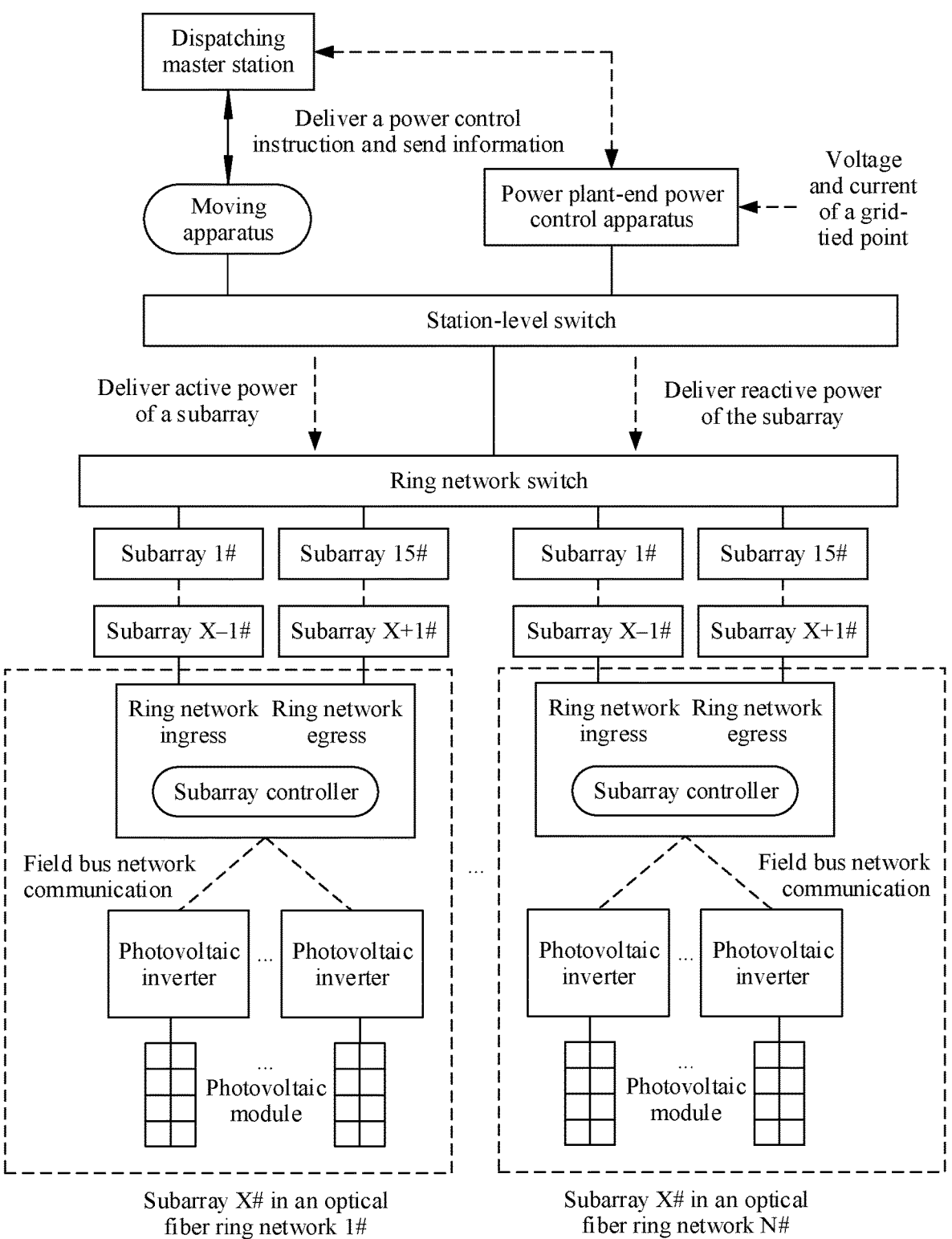
FIG. 6b is another schematic diagram of transparently transmitting, by a power plant-end power control apparatus, a power control instruction to each photovoltaic inverter or power conversion system according to an embodiment of this application.

For example, FIG. 6b is another schematic diagram of transparently transmitting, by a power plant-end power control apparatus, a power control instruction to each photovoltaic inverter or power conversion system according to an embodiment of this application. When the power plant has a small capacity and there are a small total quantity of photovoltaic inverters or power conversion systems, a field bus network may be directly established between the power plant-end power control apparatus and each photovoltaic inverter or power conversion system for communication. The field bus network communication is controller area network (controller area network, CAN) communication, Ethernet for control automation technology (EtherCAT) communication, or open source real-time communication (Ethernet Powerlink) communication.

Figure 6C:
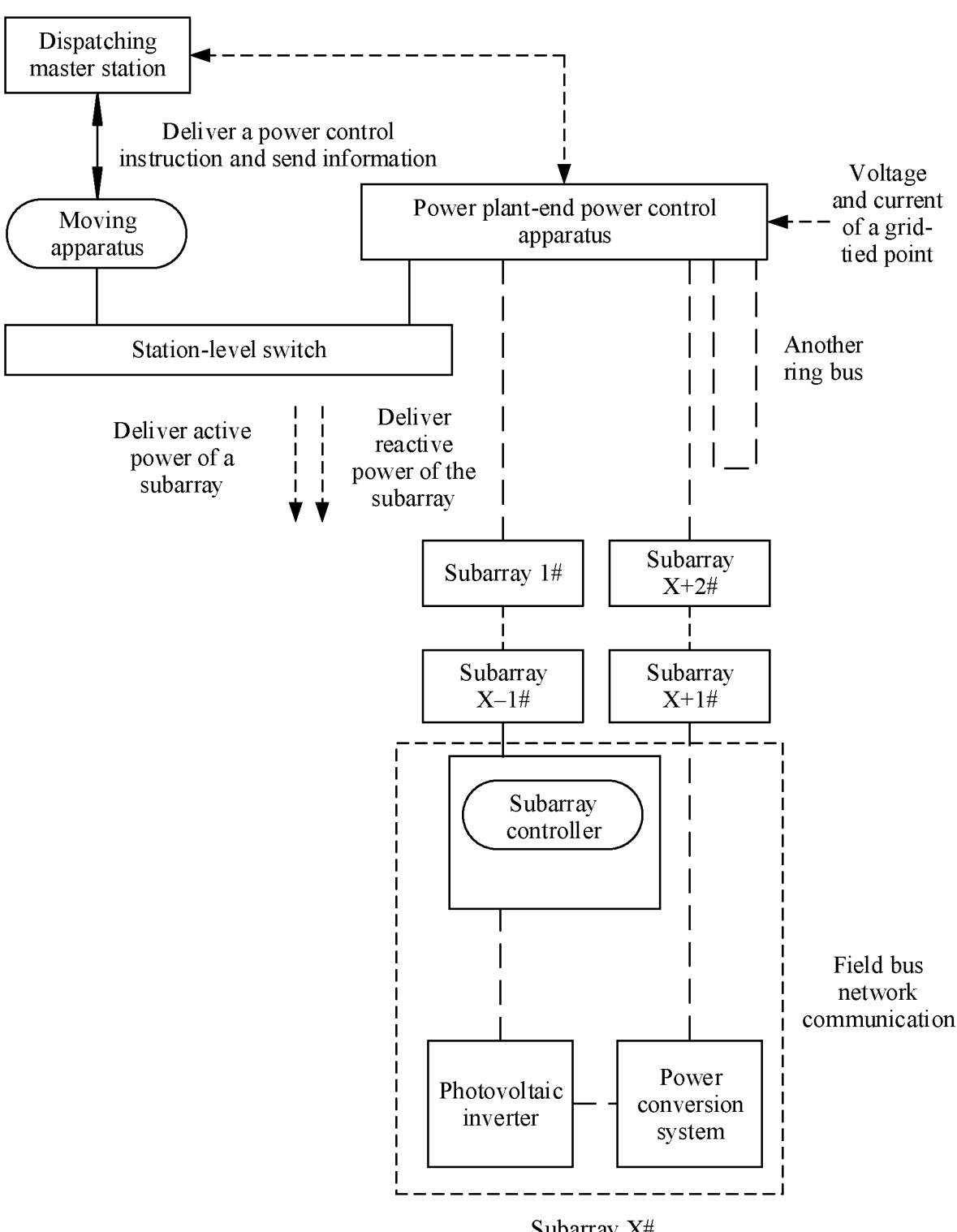
FIG. 6c is still another schematic diagram of transparently transmitting, by a power plant-end power control apparatus, a power control instruction to each photovoltaic inverter or power conversion system according to an embodiment of this application.

For example, FIG. 6c is still another schematic diagram of transparently transmitting, by a power plant-end power control apparatus, a power control instruction to each photovoltaic inverter or power conversion system according to an embodiment of this application. Ethernet network communication, for example, GOOSE communication or UDP communication, is performed between the power plant-end power control apparatus and each subarray controller or subarray communication device, and field bus network communication, for example, CAN communication, EtherCAT communication, or Ethernet Powerlink communication, is performed between each subarray controller or subarray communication device and a target photovoltaic inverter or a target power conversion system in a corresponding subarray.

Based on the technical solution, fast communication is implemented between the power plant-end power control apparatus 100 and the target photovoltaic inverter or power conversion system. Although there is transmission from the power plant-end power control apparatus 100 and the subarray controller or the subarray communication device and transmission from the subarray controller or the subarray communication device to the target photovoltaic inverter or power conversion system, the subarray controller or the subarray communication device implements only network transparent transmission, and does not make any change to the power control instruction. Therefore, logically, the power plant-end power control apparatus 100 directly delivers the power control instruction to the target photovoltaic inverter or power conversion system over a network, that is, the power plant-end power control apparatus 100 directly communicates with the target photovoltaic inverter or power conversion system. Compared with a case in which when TCP communication is conventionally performed between the power plant-end power control apparatus and the target photovoltaic inverter or power conversion system, because it needs to take at least 10 milliseconds to perform encoding and decoding between the two communication points and perform an entire transmission process, two handshakes need to be performed between the power plant-end power control apparatus and the subarray controller or the subarray communication device and between the subarray controller or the subarray communication device and the target photovoltaic inverter or power conversion system, that is, 20 milliseconds needs to be consumed, or the power plant-end power control apparatus directly communicates with the target photovoltaic inverter or power conversion system, that is, the subarray controller or the subarray communication device implements only network transparent transmission, and does not perform a handshake, and 10 milliseconds needs to be consumed, in this embodiment of this application, GOOSE communication, UDP communication, or field bus network communication is performed between the power plant-end power control apparatus 100 and the target photovoltaic inverter or power conversion system, to reduce a network packet assembly and disassembly time as much as possible, improve timeliness, and implement fast communication between the power plant-end power control apparatus and the target photovoltaic inverter or power conversion system within 5 milliseconds, so as to reserve technical feasibility for implementing a 30-millisecond reactive power response based on the photovoltaic inverter or the power conversion system.

The foregoing embodiments may be used separately, or may be used in combination to achieve different technical effects.

In the foregoing embodiments provided in this application, the method provided in embodiments of this application is described from a perspective that the power plant-end power control apparatus in the power plant is used as an execution body. To implement the functions in the method provided in embodiments of this application, the power plant-end power control apparatus in the power plant may include a hardware structure and/or a software module, and implement the functions by using the hardware structure, the software module, or a combination of the hardware structure and the software module. Whether a function in the functions is performed by using the hardware structure, the software module, or the combination of the hardware structure and the software module depends on particular applications and design constraints of the technical solutions.

Figure 7:
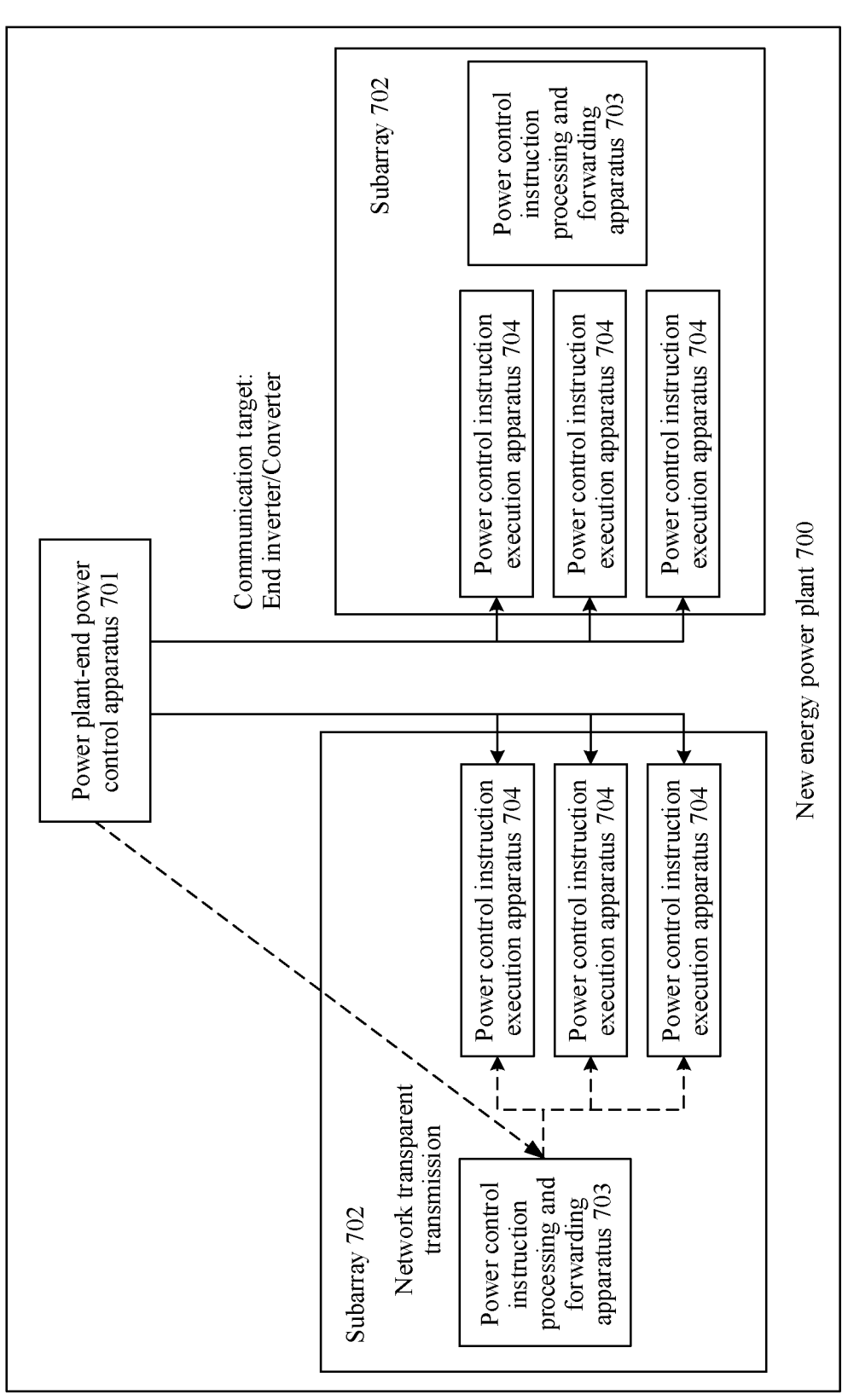
FIG. 7 is another schematic diagram of a structure of a new energy power plant according to an embodiment of this application.

Based on a same technical concept, an embodiment of this application further provides a new energy power plant 700. The new energy power plant 700 includes a power plant-end power control apparatus, a power control instruction processing and forwarding apparatus, and a power control instruction execution apparatus that are configured to perform the method shown in FIG. 5 to FIG. 6c. For example, referring to FIG. 7, the power plant a character string corresponding to a target power control instruction execution apparatus 704.

In a possible design, when transparently transmitting the second power control instruction to each power control instruction execution apparatus 704, the power control instruction processing and forwarding apparatus 703 in the power plant 700 is specifically configured to:

the power control instruction processing and forwarding apparatus 703 in the power plant 700 directly delivers the second power control instruction to a target power control instruction execution apparatus 704 in the subarray 702 corresponding to the power control instruction processing and forwarding apparatus 703 through a communication network chip. The target power control instruction execution apparatus 704 is a power control instruction execution apparatus 704 indicated by the address identifier information carried in the second power control instruction.

In a possible design, the power control instruction processing and forwarding apparatus 703 includes a subarray controller or a subarray communication device;

the subarray controller is a device that is installed in the subarray 702 and that matches a step-up transformer in the subarray 702, and the subarray controller includes any one or more of a subarray data acquisition apparatus, an all-in-one smart box-type transformer measurement and control apparatus, a communication management apparatus, or a protocol conversion apparatus;

the subarray communication device is any one or more of a network switch, a gateway machine, an optical fiber repeater, a bus repeater, or a bus extension apparatus; and the power control instruction execution apparatus 704 includes a photovoltaic inverter or a power conversion system.

In a possible design, Ethernet network communication and/or field bus network communication are/is performed between the power plant-end power control apparatus 701 and each power control instruction execution apparatus 704;

the Ethernet network communication is any one of generic object oriented substation event GOOSE communication or user datagram protocol UDP communication; and the field bus network communication is any one of controller area network CAN communication, Ethernet for control automation technology EtherCAT communication, or open source real-time communication technology Ethernet Powerlink communication.

In a possible design, the power plant-end power control apparatus 701 is further configured to:

acquire the voltage analog signal of the grid-tied point of the power plant 700 at the current moment, process the voltage analog signal of the grid-tied point at the current moment based on the instantaneous voltage amplitude calculation algorithm, to determine the instantaneous voltage amplitude of the grid-tied point at the current moment, and determine the frequency value based on the instantaneous voltage amplitude;

determine whole-plant reactive power and/or whole-plant active power of the power plant 700 at the current moment based on the instantaneous voltage amplitude of the grid-tied point at the current moment and the frequency value; and determine whether the whole-plant reactive power and/or the whole-plant active power of the power plant 700 at the current moment fall/falls outside a preset interval.

Based on a same technical concept, an embodiment of this application further provides an apparatus 800 for implementing a fast power response. The apparatus 800 may be anew energy power plant including a power plant-end power control apparatus and at least two subarrays. Each subarray includes a power control instruction processing and forwarding apparatus and at least three power control instruction execution apparatuses. Alternatively, the apparatus 800 may be a power plant-end power control apparatus in a new energy power plant. For example, referring to FIG. 8, the apparatus 800 may include at least one processor 801 and a communication interface 803 communicatively connected to the at least one processor 801.

The at least one processor 801 executes instructions stored in a memory 802, so that the apparatus 800 performs the method shown in FIG. 5 to FIG. 6c.

Optionally, the memory 802 is located outside the apparatus 800.

Figure 8:
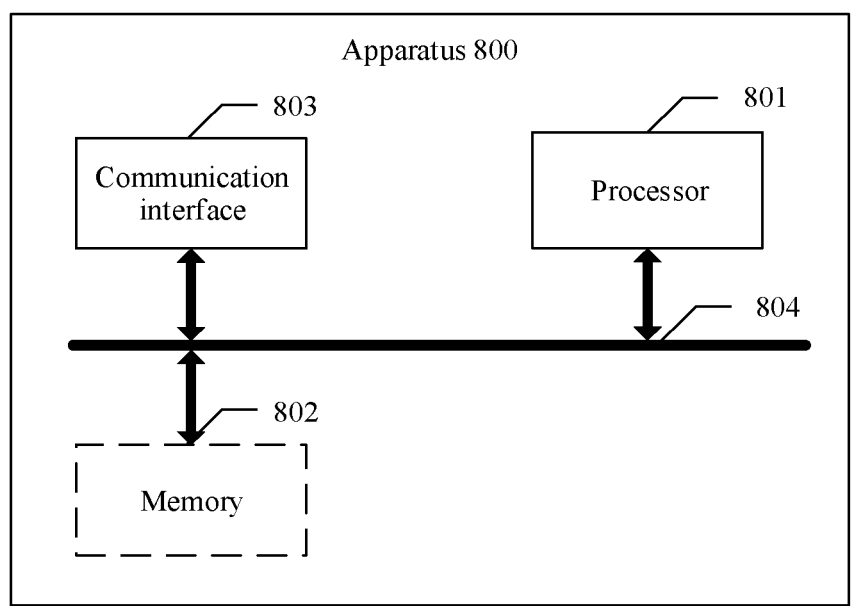
FIG. 8 is a schematic diagram of a structure of an apparatus for implementing a fast power response according to an embodiment of this application.

Optionally, the apparatus 800 includes a memory 802 communicatively connected to the at least one processor 801. The memory 802 stores instructions that can be executed by the at least one processor 801. In FIG. 8, a dashed line is used for indicating that the memory 802 is optional for the apparatus 800.

The processor 801 and the memory 802 may be coupled by using an interface circuit, or may be integrated. This is not limited herein.

A specific connection medium among the processor 801, the memory 802, and the communication interface 803 is not limited in this embodiment of this application. In this embodiment of this application, the processor 801, the memory 802, and the communication interface 803 are connected by using a bus 804 in FIG. 8. The bus is represented by a bold line in FIG. 8. A connection manner between other components is merely an example for description, and imposes no limitation. The bus may be classified into an address bus, a data bus, a control bus, and the like. For ease of representation, only one bold line is used to represent the bus in FIG. 8, but this does not mean that there is only one bus or only one type of bus.

It should be understood that the processor in embodiments of this application may be implemented by hardware or software. When the processor is implemented by the hardware, the processor may be a logic circuit, an integrated circuit, or the like. When the processor is implemented by the software, the processor may be a general-purpose processor, and is implemented by reading software code stored in the memory.

For example, the processor may be a central processing unit (central processing unit, CPU), or may be another general-purpose processor, a digital signal processor (digital signal processor, DSP), an application-specific integrated circuit (application-specific integrated circuit, ASIC), a field programmable gate array (field programmable gate array, FPGA) or another programmable logic device, a discrete gate or a transistor logic device, or a discrete hardware component. The general-purpose processor may be a microprocessor, or the processor may be any conventional processor or the like.

It may be understood that the memory in embodiments of this application may be a volatile memory or a nonvolatile memory, or may include a volatile memory and a nonvolatile memory. The nonvolatile memory may be a read-only memory (read-only memory, ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (random access memory, RAM), and is used as an external cache. Based on descriptions used as an example instead of a limitation, many forms of RAMs may be used, for example, a static random access memory (static RAM, SRAM), a dynamic random access memory (dynamic RAM, DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

It should be noted that when the processor is a general-purpose processor, a DSP, an ASIC, an FPGA or another programmable logic device, a discrete gate or a transistor logic device, or a discrete hardware component, the memory (storage module) may be integrated into the processor.

It should be noted that the memory described in this specification includes but is not limited to these memories and any memory of another proper type.

Based on a same technical concept, an embodiment of this application further provides a computer storage medium, including a program or instructions. When the program or the instructions runs or run on a computer, the method shown in FIG. 5 to FIG. 6c is performed.

Based on a same technical concept, an embodiment of this application further provides a chip. The chip is coupled to a memory, and is configured to read and execute program instructions stored in the memory, so that the method shown in FIG. 5 to FIG. 6c is performed.

Based on a same technical concept, an embodiment of this application further provides a computer program product including instructions. When the computer program product runs on a computer, the method shown in FIG. 5 to FIG. 6c is performed.

It should be understood that all related content of the steps in the foregoing method embodiments may be cited in function descriptions of the corresponding functional modules. Details are not described herein.

A person skilled in the art should understand that embodiments of this application may be provided as a method, a system, or a computer program product. Therefore, this application may use a form of hardware only embodiments, software only embodiments, or embodiments with a combination of software and hardware. In addition, this application may use a form of a computer program product implemented on one or more computer-usable storage media (including but not limited to a disk memory, a CD-ROM, an optical memory, and the like) that include computer-usable program code.

This application is described with reference to the flowcharts and/or the block diagrams of the method, the device (system), and the computer program product according to this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a dedicated computer, an embedded processor, or a processor of another programmable data processing device to generate a machine, so that the instructions executed by the computer or the processor of the another programmable data processing device generate an apparatus for implementing a specific function in one or more procedures in the flowcharts and/or in one or more blocks in the block diagrams.

Alternatively, these computer program instructions may be stored in a computer-readable memory that can indicate a computer or another programmable data processing device to work in a specific manner, so that the instructions stored in the computer-readable memory generate an artifact that includes an instruction apparatus. The instruction apparatus implements a specific function in one or more procedures in the flowcharts and/or in one or more blocks in the block diagrams.

Alternatively, these computer program instructions may be loaded onto a computer or another programmable data processing device, so that a series of operations and steps are performed on the computer or the another programmable device, to generate computer-implemented processing. Therefore, the instructions executed on the computer or the another programmable device provide steps for implementing a specific function in one or more procedures in the flowcharts and/or in one or more blocks in the block diagrams.

It is clear that a person skilled in the art may make various modifications and variations to this application without departing from the protection scope of this application. This application is intended to cover these modifications and variations to this application provided that they fall within the scope defined by the claims of this application and their equivalent technologies.

The invention claimed is:

1. A method for implementing a power response, applied to a power plant power control apparatus in a energy power plant, wherein the power plant comprises at least two subarrays, each of the subarrays comprising a power control instruction processing and forwarding apparatus and at least three power control instruction execution apparatuses, wherein the method comprises:

determining a whole-plant reactive power target value of the power plant based on an acquired voltage analog signal of a grid-tied point of the power plant at a current moment, wherein the determining the whole-plant reactive power target value of the power plant comprises:

acquiring the voltage analog signal of the grid-tied point of the power plant at the current moment;

processing the voltage analog signal of the grid-tied point at the current moment based on an instantaneous voltage amplitude calculation algorithm that is an $\alpha\beta$ transformation method for constructing a two-phase voltage, to determine an instantaneous voltage amplitude of the grid-tied point at the current moment; and determining the whole-plant reactive power target value of the power plant based on the instantaneous voltage amplitude of the grid-tied point at the current moment;

determining, based on the whole-plant reactive power target value, a second power control instruction readable by each power control instruction execution apparatus in each subarray in the power plant, wherein the second power control instruction indicates a power target value of each power control instruction execution apparatus existing when the whole-plant reactive power target value is reached; and transmitting the second power control instruction to each power control instruction execution apparatus through the respective power control instruction processing and forwarding apparatus in each subarray in the power plant, so that each power control instruction execution apparatus makes a power response based on the second power control instruction.

2. The method according to claim 1, wherein:

the power target value of each power control instruction execution apparatus is a power target absolute value, a power target percentage value, a variation absolute value, or a variation percentage value, the power target percentage value is a percentage value between the power target absolute value and rated power of the power control instruction execution apparatus, the variation absolute value is an absolute difference between the power target absolute value and power of the power control instruction execution apparatus at the current moment, and the variation percentage value is a percentage value between the variation absolute value and the rated power of the power control instruction execution apparatus.

3. The method according to claim 1, wherein the second power control instruction carries address identifier information of each power control instruction execution apparatus, and the address identifier information comprises at least one of an internet protocol (IP) address, a unicast media access control (MAC) address, or a multicast or broadcast MAC address.

4. The method according to claim 1, wherein transmitting the second power control instruction to each power control instruction execution apparatus through the respective power control instruction processing and forwarding apparatus in each subarray in the power plant comprises:

delivering the second power control instruction to the respective power control instruction processing and forwarding apparatus in each subarray in the power plant, so that the power control instruction processing and forwarding apparatus directly delivers the second power control instruction to a target power control instruction execution apparatus in the subarray corresponding to the power control instruction processing and forwarding apparatus, wherein the target power control instruction execution apparatus is a power control instruction execution apparatus indicated by address identifier information carried in the second power control instruction.

5. The method according to claim 1, wherein:

the power control instruction processing and forwarding apparatus comprises a subarray controller or a subarray communication device;

the subarray controller is a device that is installed in the subarray and that matches a step-up transformer in the subarray, and the subarray controller is any one or more of a subarray data acquisition apparatus, an all-in-one smart box-type transformer measurement and control apparatus, a communication management apparatus, or a protocol conversion apparatus;

the subarray communication device is any one or more of a network switch, a gateway machine, an optical fiber repeater, a bus repeater, or a bus extension apparatus; and the power control instruction execution apparatus comprises a photovoltaic inverter or a power conversion system.

6. The method according to claim 1, wherein at least one of Ethernet network communication or field bus network communication is performed between the power plant power control apparatus and each power control instruction execution apparatus;

the Ethernet network communication is any one of generic object oriented substation event GOOSE communication or user datagram protocol (UDP) communication; and the field bus network communication is any one of controller area network (CAN) communication, Ethernet for control automation technology (EtherCAT) communication, or open source real-time communication technology Ethernet Powerlink communication.

7. The method according to claim 1, wherein before determining the whole-plant reactive power target value of the power plant, the method further comprises:

determining a frequency value based on the instantaneous voltage amplitude;

determining at least one of whole-plant reactive power or whole-plant active power of the power plant at the current moment based on the instantaneous voltage amplitude of the grid-tied point at the current moment and the frequency value; and determining whether at least one of the whole-plant reactive power or the whole-plant active power of the power plant at the current moment falls outside a preset interval.

8. The method according to claim 1, wherein the instantaneous voltage amplitude is further determined based on both a semi-cycle Fourier calculation algorithm and a full-cycle Fourier calculation algorithm.

9. The method according to claim 1, wherein the voltage analog signal is acquired by using a potential transformer.

10. The method according to claim 1, wherein a sampling frequency for acquiring the voltage analog signal is greater than or equal to 1200 HZ.

11. A energy power plant, comprising:

a power plant power control apparatus and at least two subarrays, wherein each of the subarrays comprises a power control instruction processing and forwarding apparatus and at least three power control instruction execution apparatuses, wherein:

the power plant power control apparatus is configured to determine a whole-plant reactive power target value of the power plant based on of an acquired voltage analog signal of a grid-tied point of the power plant at a current moment, wherein the power plant power control apparatus is configured to:

acquire the voltage analog signal of the grid-tied point of the power plant at the current moment;

process the voltage analog signal of the grid-tied point at the current moment based on an instantaneous voltage amplitude calculation algorithm that is an $\alpha\beta$ transformation method for constructing a two-phase voltage, to determine an instantaneous voltage amplitude of the grid-tied point at the current moment; and determine the whole-plant reactive power target value of the power plant based on the instantaneous voltage amplitude of the grid-tied point at the current moment;

the power plant power control apparatus is further configured to: determine, based on the whole-plant reactive power target value, a second power control instruction readable by each power control instruction execution apparatus in each subarray in the power plant, and deliver the second power control instruction to the respective power control instruction processing and forwarding apparatus in each subarray in the power plant, wherein the second power control instruction indicates a power target value of each power control instruction execution apparatus existing when the whole-plant reactive power target value is reached;

the respective power control instruction processing and forwarding apparatus in each subarray in the power plant is configured to transmit the second power control instruction to each power control instruction execution apparatus; and each power control instruction execution apparatus is configured to make a power response based on the second power control instruction.

12. The power plant according to claim 11, wherein:

the power target value of each power control instruction execution apparatus is a power target absolute value, a power target percentage value, a variation absolute value, or a variation percentage value, the power target percentage value is a percentage value between the power target absolute value and rated power of the power control instruction execution apparatus, the variation absolute value is an absolute difference between the power target absolute value and power of the power control instruction execution apparatus at the current moment, and the variation percentage value is a percentage value between the variation absolute value and the rated power of the power control instruction execution apparatus.

13. The power plant according to claim 11, wherein the second power control instruction carries address identifier information of each power control instruction execution apparatus, and the address identifier information comprises at least one of an internet protocol (IP) address, a unicast media access control (MAC) address, or a multicast or broadcast MAC address.

14. The power plant according to claim 11, wherein when transmitting the second power control instruction to each power control instruction execution apparatus, the respective power control instruction processing and forwarding apparatus in each subarray in the power plant is configured to:

deliver the second power control instruction to a target power control instruction execution apparatus in the subarray corresponding to the power control instruction processing and forwarding apparatus, wherein the target power control instruction execution apparatus is a power control instruction execution apparatus indicated by address identifier information carried in the second power control instruction.

15. The power plant according to claim 11, wherein:

the power control instruction processing and forwarding apparatus comprises a subarray controller or a subarray communication device;

the subarray controller is a device that is installed in the subarray and that matches a step-up transformer in the subarray, and the subarray controller is any one or more of a subarray data acquisition apparatus, an all-in-one smart box-type transformer measurement and control apparatus, a communication management apparatus, or a protocol conversion apparatus;

the subarray communication device is any one or more of a network switch, a gateway machine, an optical fiber repeater, a bus repeater, or a bus extension apparatus; and the power control instruction execution apparatus comprises a photovoltaic inverter or a power conversion system.

16. The power plant according to claim 11 is operable such that at least one of Ethernet network communication or field bus network communication is performed between the power plant power control apparatus and each power control instruction execution apparatus; wherein:

the Ethernet network communication is any one of generic object oriented substation event GOOSE communication or user datagram protocol (UDP) communication; and the field bus network communication is any one of controller area network (CAN) communication, Ethernet for control automation technology (EtherCAT) communication, or open source real-time communication technology Ethernet Powerlink communication.

17. The power plant according to claim 11, wherein the power plant power control apparatus is further configured to:

determine a frequency value based on the instantaneous voltage amplitude;

determine at least one of whole-plant reactive power or whole-plant active power of the power plant at the current moment based on the instantaneous voltage amplitude of the grid-tied point at the current moment and the frequency value; and determine whether at least one of the whole-plant reactive power or the whole-plant active power of the power plant at the current moment falls outside a preset interval.

18. The power plant according to claim 11, wherein the instantaneous voltage amplitude is further determined based on both a semi-cycle Fourier calculation algorithm and a full-cycle Fourier calculation algorithm.

19. A power plant power control apparatus, comprising:

one or more memories configured to store instructions; and one or more processors coupled to the one or more memories and configured to execute the instructions to cause the power plant power control apparatus to:

determine a whole-plant reactive power target value of an energy power plant based on an acquired voltage analog signal of a grid-tied point of the power plant at a current moment, wherein the determining the whole-plant reactive power target value of the power plant comprises:

acquiring the voltage analog signal of the grid-tied point of the power plant at the current moment;

processing the voltage analog signal of the grid-tied point at the current moment based on an instantaneous voltage amplitude calculation algorithm that is an $\alpha\beta$ transformation method for constructing a two-phase voltage, to determine an instantaneous voltage amplitude of the grid-tied point at the current moment; and determining the whole-plant reactive power target value of the power plant based on the instantaneous voltage amplitude of the grid-tied point at the current moment;

determine, based on the whole-plant reactive power target value, a second power control instruction; and transmit the second power control instruction.

20. The power plant power control apparatus according to claim 19, wherein the instantaneous voltage amplitude is further determined based on both a semi-cycle Fourier calculation algorithm and a full-cycle Fourier calculation algorithm.

* * * * *